United States Patent
Di Cairano et al.

(10) Patent No.: US 9,744,620 B2
(45) Date of Patent: Aug. 29, 2017

(54) CONTROL OF PROCESSING MACHINES WITH REDUNDANT ACTUATORS

(71) Applicant: Mitsubishi Electric Research Laboratories, Inc., Cambridge, MA (US)

(72) Inventors: Stefano Di Cairano, Somerville, MA (US); Abraham Goldsmith, Boston, MA (US); Scott Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 339 days.

(21) Appl. No.: 14/679,359

(22) Filed: Apr. 6, 2015

(65) Prior Publication Data
US 2016/0288256 A1    Oct. 6, 2016

(51) Int. Cl.
| | | |
|---|---|---|
| G06F 19/00 | (2011.01) | |
| B23K 26/082 | (2014.01) | |
| G05B 19/19 | (2006.01) | |
| G05B 19/41 | (2006.01) | |

(52) U.S. Cl.
CPC ............ *B23K 26/082* (2015.10); *G05B 19/19* (2013.01); *G05B 19/195* (2013.01); *G05B 19/41* (2013.01); *G05B 2219/34148* (2013.01); *G05B 2219/41105* (2013.01); *G05B 2219/41194* (2013.01); *G05B 2219/42224* (2013.01); *G05B 2219/45041* (2013.01)

(58) Field of Classification Search
CPC ....... G05B 19/19; G05B 19/195; G05B 19/41
See application file for complete search history.

(56) References Cited

U.S. PATENT DOCUMENTS

| 5,262,707 A | 11/1993 | Okazaki et al. |
|---|---|---|
| 5,452,275 A | 9/1995 | Ogawa |
| 5,751,585 A | 5/1998 | Cutler et al. |

(Continued)

FOREIGN PATENT DOCUMENTS

JP    2015125747 A1    8/2015

OTHER PUBLICATIONS

Olaru et al. "Compact Explicit MPC with Guarantee of Feasibility for Tracking," Decision and Control, 2005 European Control Conf. 44th IEEE Conference on, Spain. Dec. 12, 2005.

*Primary Examiner* — Vincent Tran
(74) *Attorney, Agent, or Firm* — Gene Vinokur; James McAleenan; Hironori Tsukamoto

(57) ABSTRACT

An operation of a processing machine with redundant actuators is controlled according to a reference trajectory by selecting, from a set of points forming a segment of the reference trajectory to be processed for a period of time, a subset of points corresponding to a fraction of the period of time. The subset of points is selected such that the redundant actuators are capable to position the worktool at each point in the subset within the period of time and are capable to maintain the worktool at the last point of the subset after the period of time while satisfying constraints on motion of the redundant actuators. The segment of the reference trajectory is modified in the time domain and the control inputs for controlling the motion of the redundant actuators are determined using the modified segment of the reference trajectory.

18 Claims, 17 Drawing Sheets

(56) References Cited

U.S. PATENT DOCUMENTS

| | | | |
|---|---|---|---|
| 5,798,927 | A | 8/1998 | Cutler et al. |
| 5,801,939 | A | 9/1998 | Okazaki |
| 5,837,962 | A | 11/1998 | Overbeck |
| 6,313,433 | B1 | 11/2001 | Sukman et al. |
| 6,492,292 | B2 | 12/2002 | Wu et al. |
| 6,706,998 | B2 | 3/2004 | Cutler |
| 6,706,999 | B1 | 3/2004 | Barrett et al. |
| 7,050,208 | B2 | 5/2006 | Overbeck |
| 7,245,412 | B2 | 7/2007 | Bruland et al. |
| 7,315,038 | B2 | 1/2008 | Bruland |
| 7,710,060 | B2 | 5/2010 | Cardinale et al. |
| 7,792,604 | B2 * | 9/2010 | Hong ............... G05B 19/41 700/187 |
| 2003/0193522 | A1 * | 10/2003 | Chandhoke ........ G05B 19/416 715/764 |
| 2013/0096700 | A1 * | 4/2013 | Tezuka ............... G05B 19/408 700/83 |
| 2013/0190898 | A1 | 7/2013 | Shilpiekandula et al. |
| 2013/0307459 | A1 * | 11/2013 | Tian .................. G05B 19/416 318/570 |
| 2014/0114463 | A1 | 4/2014 | Shilpiekandula et al. |
| 2015/0148924 | A1 * | 5/2015 | Di Cairano .......... G05B 17/02 700/86 |

\* cited by examiner

CONTROL OF PROCESSING MACHINES WITH REDUNDANT ACTUATORS

FIELD OF THE INVENTION

The present invention relates generally to controlling machines, and more particularly to controlling processing machines with redundant actuators.

BACKGROUND OF THE INVENTION

A processing machine with redundant actuators includes multiple actuators for jointly positioning a worktool along each axis of motion. The position of the worktool is the algebraic sum of the position of the slow actuator and fast actuator positions. Thus, the machine is over-actuated, and degrees of freedom are available to optimize the movement of the worktool along a desired processing pattern. The worktool can be positioned by independent operations of the redundant actuators, and thus the task of positioning the worktool along the processing pattern can be separated between redundant actuators. One example of such a machine is a laser processing machine with redundant actuators.

Some conventional methods, see, e.g., U.S. Pat. Nos. 5,452,275 and 7,710,060, use frequency separation techniques to assign the task of positioning the laser beam to two actuators. For example, the processing pattern is filtered by a low pass filter. The filtered signal becomes a reference trajectory for one actuator, while a difference between the processing pattern and the filtered signal becomes a reference trajectory for another actuator. However, the filtering does not consider various constraints of the actuators, such as constraints on the accelerations or velocities. Furthermore, there is no guarantee that the separation in frequencies provides the optimal reference trajectories.

One method described in U.S. Publication 2013/0190898 generates the reference trajectories that account for the constraints based on Model Predictive Control (MPC). MPC is based on an iterative, finite horizon optimization of a model of a machine and has the ability to anticipate future events to take appropriate control actions. This is achieved by optimizing the operation of the machine over a future finite time-horizon subject to constraints, and only implementing the control over the current timeslot. For example, the constraints can represent physical limitation of the machine, legitimate and safety limitations on the operation of the machine, and performance limitations on a trajectory. A control strategy for the machine is admissible when the motion generated by the machine for such a control strategy satisfies all the constraints.

For example, at a current time t, a state of the machine is sampled and an admissible cost minimizing control strategy is determined for a relatively short time horizon in the future. Specifically, an online or on-the-fly calculation determines a cost-minimizing control strategy until a future time t+T. Only the first step of the control strategy is implemented, then the state is sampled again and the calculations are repeated starting from the new current state, yielding a new control and new predicted state path. The prediction horizon is continuously shifted forward. For this reason, MPC is also called receding horizon control.

However, due to the tracking nature of the MPC in this problem, such a receding horizon control approach has no guarantee, in general, of finding a solution to the optimization problem. Due to the receding horizon nature of the finite horizon optimal control problem, the existence of the solution for a certain window of data (horizon) does not by itself guarantee that when the window is shifted forward in time, a solution still exists.

One method solves this MPC problem using an initial feasible reference trajectory and an additional terminal equality constraint. That method imposes coincidence of the MPC-generated trajectory with the reference trajectory at specific instants of time, namely the end of each data window, and uses the remaining degrees of freedom to optimize the trajectory performance. However, the loss of performance caused by the terminal equality constraint is significant, and a long horizon required for this method results in significant computational complexity.

Accordingly, there is a need for a method for controlling an operation of a processing machine with redundant actuators that guarantees a priori satisfaction of constraints of the operation for processing variety of patterns.

SUMMARY OF THE INVENTION

It is an object of some embodiments of the invention to provide a system and a method for controlling operations of a processing machine. The processing machine includes redundant actuators for jointly positioning a worktool along each axis of motion. For example, the processing machine includes a fast actuator and a slow actuator for jointly positioning a worktool according to a pattern. The pattern is processed according to a reference trajectory defined in a spatial domain by locations of the points for positioning the worktool according to the pattern and defined a time domain by a relative time for positioning the worktool on each point of the reference trajectory. The points of the reference trajectory are continuous in the time domain and separated by a unit of time, e.g., 1 millisecond (ms).

It is a further object of some embodiments to provide such a method that ensures a feasibility of the processing the reference trajectory satisfying constraints on the processing and movements of the actuators. For example, some embodiments are based on recognition that a redundant processing machine can fail to process a given reference trajectory. For example, the reference trajectory can require the slow actuator to move with the speed exceeding its limitations. Accordingly, there is a need to modify the reference trajectory in the time domain, while preserving the reference trajectory in the spatial domain. For example, one embodiment increases the time of positioning the worktool between at least some points of the reference trajectory to ensure the feasibility of the processing.

It is a further object of some embodiments of the invention to provide such a method that is suitable for modifying the time domain of the reference trajectory in real time, i.e., concurrently with the controlling of the processing machine. To that end, it was recognized that the time domain of the reference trajectory can be modified sequentially for each period of time. Such recognition allows selecting the period of time to be less than the entire duration of the reference trajectory based on, e.g., computational power of a processor of the processing machine, to enable the processor to modify the time domain of the reference trajectory concurrently with the controlling the motion of the actuators.

Some embodiments of the invention are based on recognition that such a sequential modification of the reference trajectory imposes two requirements for modifying segments of the reference trajectory. The first requirement ensures the feasibility of processing the segment of the reference trajectory such that the constraints on the processing and the movements of the actuators are satisfied. This requirement follows from the initial objective of the embodiments to ensure the feasibility of processing the pattern. However, the second requirement, which follows for the sequential processing of the reference trajectory, ensures that the processing of the segment of the reference trajectory does not move the processing machine in such a state that necessitate the violation of the constraints for processing any future segments of the reference trajectory. If these two requirements are satisfied, the sequential modification can generate the entire feasible reference trajectory.

Some embodiments of the invention are based on realization that if the speed of processing of the reference trajectory places the processing machine in such a state that allows the processing machine to maintain the worktool at the processed point for indefinite period of time without violation of the constraints, such speed allows the processing machine to adapt to any variation of the subsequent segments of the reference trajectory. It was realized that the ability of dynamics of the processing machine to preserve its state after the current processing ensures that the processing does not jeopardize the future processing, and thus such a processing satisfies the second requirement.

Furthermore, it was realized that the ability of maintaining the laser beam at the points of the time period can be analytically tested based on a combination locations of the points of the portion of the trajectory and a state of the processing machine. For example, such a combination can be represented as a set of linear inequalities determined by constructing the subset of admissible machine states and locations of the points such that when the locations of the point are continuously provided as command to the slow actuator from a current point of time to any future time, the motion of the machine satisfies the constraints at any future time.

Such a realization allows determining the reference trajectory based on motion of an actuator having acceleration and velocity constraints of the fast actuator and unlimited range of the motion. Such a reference trajectory is time efficient but can be infeasible. However, the reference trajectory can be modified based on a motion of the slow actuator having speed sufficient to maintain the position of the worktool around the point with an accuracy defined by the range of motion of the fast actuator. The modification of the reference trajectory based on dynamics of the slow actuator ensures feasibility of the modified reference trajectory, while preserving its efficiency.

In one embodiment of the invention, the segment of the trajectory is a current segment about to be processed. This embodiment determines a current state of the processing machine and modifies the segment of the reference trajectory based on the current state. This embodiment is advantageous because allows measuring the current state of the machine and is simple in the implementation. However, the constraint on the ability to maintain the worktool on the point of the modified segment can make the modified reference trajectory abrupt in the time domain. To address this problem one embodiment uses the modified segments of the reference trajectory in Model Predictive Control (MPC) that uses the modified segments only as part of the prediction horizon. In this embodiment, the state of the machine is a future state, and the embodiment predicts that future state.

In some embodiments of the invention, the processing machine is a laser processing machine, the worktool is a laser beam, and the spatial pattern is a cutting pattern, and wherein the laser processing machine positions the laser beam according to the laser processing pattern.

Accordingly, one embodiment discloses a method for controlling an operation of a processing machine including redundant actuators for jointly positioning a worktool along each axis of motion. The method includes determining a reference trajectory defined in a spatial domain by points for positioning the worktool according to a processing pattern and defined in a time domain by a relative time for positioning the worktool on each point of the reference trajectory; selecting, from a set of points forming a segment of the reference trajectory to be processed for a period of time, a subset of points corresponding to a fraction of the period of time, where the subset of points is selected based on a state of the processing machine and locations of the points in the set such that the redundant actuators are capable to position the worktool at each point in the subset within the period of time and are capable to maintain the worktool at the last point of the subset after the period of time while satisfying constraints on motion of the redundant actuators; modifying the segment of the reference trajectory in the time domain by expanding units of time separating subsequent points in the subset to produce a modified segment of the reference trajectory having the subset of points processed for the period of time; and determining control inputs to the redundant actuators using the modified segment of the reference trajectory. The steps of the method are performed by at least one processor.

Another embodiment discloses a control system for controlling an operation of a processing machine including redundant actuators for jointly positioning a worktool along each axis of motion, comprising a processor for executing components of the control system. The components include a trajectory generator for determining a reference trajectory defined in a spatial domain by points for positioning the worktool according to a processing pattern and defined in a time domain by a relative time for positioning the worktool on each point of the reference trajectory; a reference governor for selecting, from a set of points forming a segment of the reference trajectory to be processed for a period of time, a subset of points corresponding to a fraction of the period of time and expanding units of time separating subsequent points in the subset to produce a modified segment of the reference trajectory having the subset of points processed for the period of time, wherein the subset of points is selected based on a state of the processing machine and locations of the points in the set such that the redundant actuators are capable to position the worktool at each point in the subset within the period of time and are capable to maintain the worktool at a point in the subset after the period of time while satisfying constraints on motion of the redundant actuators; and a controller for determining control inputs for the redundant actuators using the modified segment of the reference trajectory.

Yet another embodiment discloses a processing machine including redundant actuators for jointly positioning a worktool along each axis of motion, the redundant actuators include a fast actuator and a slow actuator, wherein a range of motion of the slow actuator is greater than a range of motion of the fast actuator, and wherein acceleration and velocity constraints of the fast actuator are greater than acceleration and velocity constraints of the slow actuator; a trajectory generator for determining spatial and time domains of a reference trajectory for positioning the worktool according to a processing pattern only with motion of an actuator having acceleration and velocity constraints of the fast actuator and unlimited range of the motion; a reference governor for modifying sequentially segments of the reference trajectory, such that the slow actuator is capable to process the modified segment of the reference trajectory within a period of time and is capable to maintain a position of the worktool around a point in the modified segment of the reference trajectory within the range of motion of the fast actuator for any time after the period of time; a predictive controller for determining a motion profile of the slow actuator for processing the modified segment within the period of time with an accuracy defined by the range of motion of the fast actuator; and a filter for determining a motion profile of the fast actuator based on a difference between the modified reference trajectory and the motion profile for the slow actuator.

DETAILED DESCRIPTION OF THE PREFERRED EMBODIMENTS

Some embodiments of the invention provide a system and a method for controlling an operation of a processing machine. The processing machine includes redundant actuators for jointly positioning a worktool along each axis of motion according to a pattern. The pattern is processed according to a reference trajectory defined in a spatial domain by locations of the points for positioning the worktool according to the pattern and defined a time domain by a relative time for positioning the worktool on each point of the reference trajectory. The points of the reference trajectory are continuous in the time domain and separated by a unit of time, e.g., 1 millisecond (ms).

One example of such a processing machine is a laser processing machine with redundant actuators. The laser beam is actuated by at least two actuators. For example, a first actuator is defined a "slow actuator" and usually has lower acceleration with a large operating range. The second actuator is defined as a "fast actuator" having higher acceleration, but smaller operating range than the range of the slow actuator. A reference trajectory for each redundant actuator is generated such that the combined motion of the actuators results in laser beam tracking the processing, e.g., a cutting, pattern.

Figure 1A:
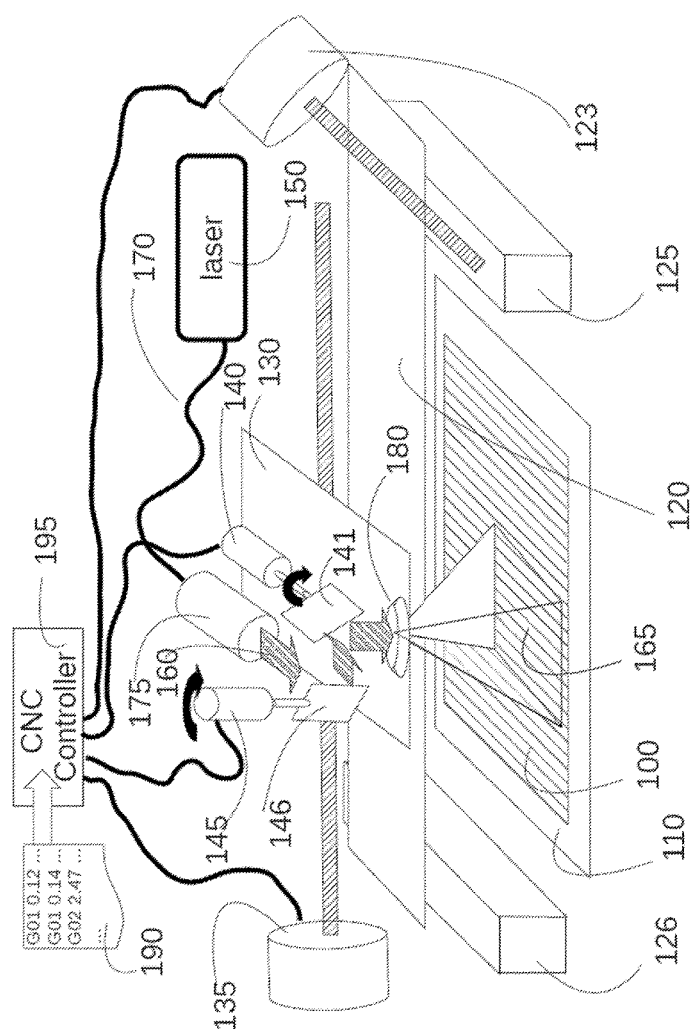
FIG. 1A is an isometric view of an example processing machine according to one embodiment of an invention.

FIG. 1A shows an isometric view of an example a processing machine according to one embodiment of an invention. In this example, the processing machine is a laser processing machine, the worktool is a laser beam, and the spatial pattern is a cutting pattern, and wherein the laser processing machine positions the laser beam according to the processing pattern. The laser processing machine is shown for illustration purpose and the design of this machine is not intended to limit the scope of the invention. The laser processing machine includes a slow actuator and a fast actuator, examples of which are provided below.

A workpiece 100 is supported on a beam dump 110 beneath a gantry 120. The gantry moves on rails 125 and 126 along a first direction, e.g., along a Y-axis. The gantry 120 is moved along the first direction by a first servo motor and a first screw 123. A platform 130 is arranged on the gantry 120 and moves with the gantry along the first direction. Also, the platform 130 is moved along a second direction, e.g., along an X-axis, by a second servo motor and a second screw 135. In this embodiment, the gantry 120, the first servo motor and the first screw 123, and the second servo motor and the first screw 135 form a motion system for moving the platform in a plane parallel to the workpiece along the first and the second direction. However, other embodiments of the invention use different types of the prismatic joints to move the platform. For example, the first prismatic joint can include a first direction linear drive motor, and the second prismatic joint can include a second direction linear drive motor.

A galvano-mirror assembly, e.g., a two-axis galvano scan head having two orthogonal galvano drives, i.e., a first drive 140 and a second drive 145, a first mirror 141 and a second mirror 146, is arranged on the platform 130. A third motion of the first mirror 141 caused by the first driver 140 positions the laser beam along a third direction, and a fourth motion of the second mirror 146 caused by the second driver 145 positions the laser beam along a fourth direction.

In the context of this description, the gantry 120 is a first actuator, or the slow actuator, with large operating range, and the galvano assembly is a second actuator, or the fast actuator, with smaller operating range. However, such usage is not intended to limit the scope of the claims. For example, in some variations the first actuators is the fast actuator, and the second actuator is the slow actuator, and in some cases both actuators may be realized by gantries moved by servo motors, or both may be realized by galvano scanners.

In various embodiments, the galvano-mirror assembly is arranged on the platform such that the third direction is fixed with respect to the first direction, and the fourth direction is fixed with respect to the second direction. For example, in one embodiment, the first direction coincides with the third direction, and the second direction coincides with the fourth direction. In another embodiment, the first direction forms an angle of 45 degrees with the third direction, and the second direction forms the angle of 45 degrees with the fourth direction.

The galvano assembly can be affixed to the platform in order to fix the direction of motion. Alternatively, the galvano assembly can be arranged on the platform rotationally, such that the mutual orientations of the first, the second, the third, and the fourth directions can be fixed before, or during the operation of the laser processing machine. In the context of this invention, the galvano assembly is the second stage, or fast stage, with small operating range.

The laser processing machine can include a laser 150 that directs a cutting laser beam 160 to the first 141 and the second 146 mirrors of the galvano-mirror assembly via an optical fiber 170 and a collimator 175. In an alternative embodiment, the laser beam is directed to the galvano assembly via diagonal mirrors moving along the Y-gantry and X-axis platform. However, other variations are also possible.

The collimated cutting laser beam 160 is directed by the mirrors through a focusing module 180 for focusing the laser beam on the workpiece, producing a combined X-axis and Y-axis galvano assembly scan area 165 on the workpiece 100, and cutting the workpiece 100. An example of the focusing module 180 is a field-flattening F-theta lens or a non-telecentric F-theta lens. A size of the workpiece 100 can be greater than the galvano scan area 165 due to the motion of the platform.

In some embodiments, the control module includes a computer numerical control (CNC) controller 195. The controller 195 can includes a processor for performing the calculations and the control. Other embodiments can use different types of controllers. The control module may control the motion system and the galvano assembly according to precomputed G-code 190 that defines a trajectory of positions of the laser beam or can performs the computations to decide how to control the machine. For example, the computations can define successive positions for the X-axis platform 130, the Y-axis gantry X-motion galvano assembly and mirror 141, and Y-motion galvano assembly and mirror 146.

In general the machines are built with actuators that have different dynamical behaviors. For example, the first actuator has usually significantly less acceleration than the second actuator, due to the difference in the displaced worktool. From this difference, the indicated names of slow and fast actuators are derived.

Figure 1B:
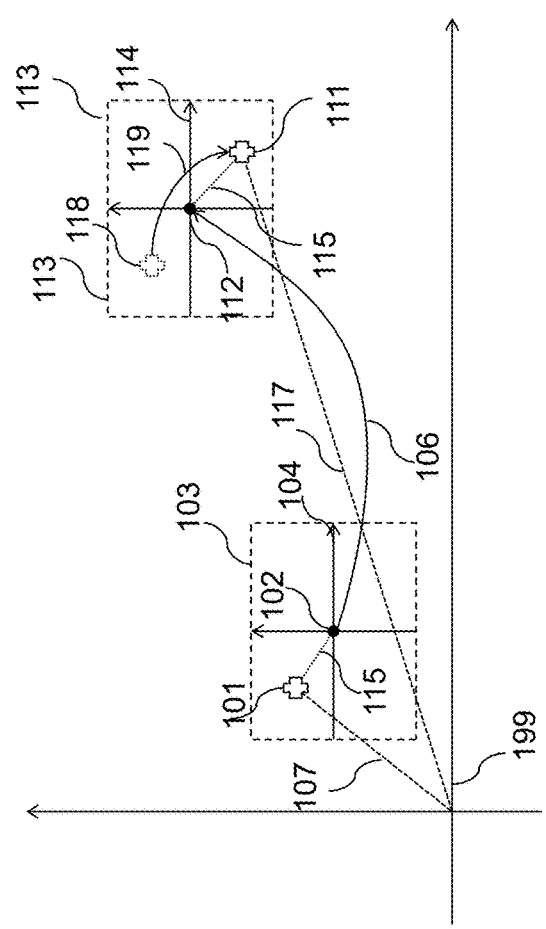
FIG. 1B is a schematic showing the relation between the position of the laser beam and the positions achieved by the slow and fast actuation.

FIG. 1B shows the relation between the position of the laser beam and the positions achieved by the slow and fast actuation. Given the global coordinate frame 199, the global position 107 of the laser beam 101 is determined based on the position of the slow actuator 102, and the relative position of the fast actuator 115 in the relative coordinate frame 104 centered at the position of the slow actuator 102. Reachable positions for the fast actuator and for the laser beam are bounded by an area 103. Following a movement 106 for the position 112 of the slow actuator, the area of reachable position for the fast actuator and for the laser beam is 113. Following a concurrent movement 119 of the fast actuator, the laser beam is not at the position 118, but is in the position 111, with relative position 115 in frame 114 centered on the position of the slow actuator and a position 117 in the global coordinate frame 199.

Thus, the machine operating range at any time is centered at the current position of the slow actuator, and has size equal to the size of the operating range of the fast actuator. By changing the position of the slow actuator, the current machine operating range is also changed, thus realizing an overall operating range, which is the composition of the operating range of the slow actuator and the operating range of the fast actuator.

Some embodiments of the invention consider constraints of the slow and fast actuators of the laser processing machine in determining trajectory and controlling the operation of the machine. For the purpose of the clarity of this disclosure, the laser processing machine with redundant actuator is arranged such that the slow actuator has a larger operating range and smaller acceleration limits than the fast actuator, while the fast actuator has a smaller operating range and larger acceleration limits than the slow actuator.

Some embodiments control the machine subject to constraints that guarantees the feasibility of tracking the reference trajectory with an error defined by bounds of a tracking error. For example, some embodiments control the machine using an optimization-based receding horizon control. A non-limited example of the receding horizon control is a Model Predictive Control (MPC).

Some embodiments are based on recognition that the redundant processing machine, such as redundant laser processing machine, can be regarded as a constrained dynamical system executing a trajectory that tracks a reference trajectory. The dynamics of the actuators of the laser processing machine defines the dynamical system, the laser cutting pattern defines a feasible reference trajectory that the machine needs to track, and the constraints on the actuation actuators of the machine result in constraints on the states and inputs of the dynamical system.

For example, the slow actuator can generate the trajectory so that certain binding constraints are satisfied, which makes it possible to generate the fast actuator trajectory as a difference of the feasible reference trajectory and the slow actuator trajectory. For the redundant processing machine, the binding constraints require that the difference between the slow actuator position and the reference trajectory position at every time (or at least in a sufficiently fine sampled grid of time instants) are always smaller or equal than the range of the fast actuator.

Figure 2A:
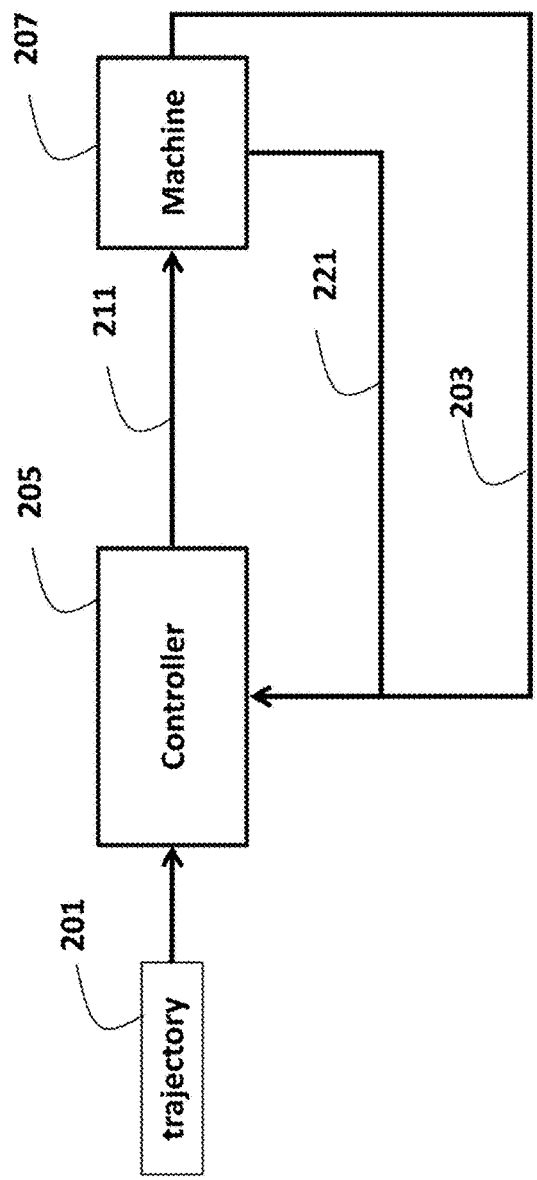
FIG. 2A is a block diagram of an example machine connected to a controller according to some embodiments of the invention.

FIG. 2A shows an example machine 207, such as laser processing machine, connected to controller 205, e.g., the MPC controller, according to some embodiments of the invention. The controller 205 is programmed according to a model of the machine. The model can be a set of equations representing changes of a state 221 and output 203 of the machine 207 over time as functions of current and previous commands 211, and previous outputs 203. The model can include constraints 204 that represent physical and operational limitations of the machine.

During the operation, the controller receives a trajectory 201 indicating the reference behavior of the machine. The trajectory can be, for example, a desired motion or desired spatial pattern. In response to receiving the trajectory 201, the controller generates commands u 211 for the machine. In response to the command, the machine updates the output y 203 and the state x 221 of the machine.

Figure 2B:
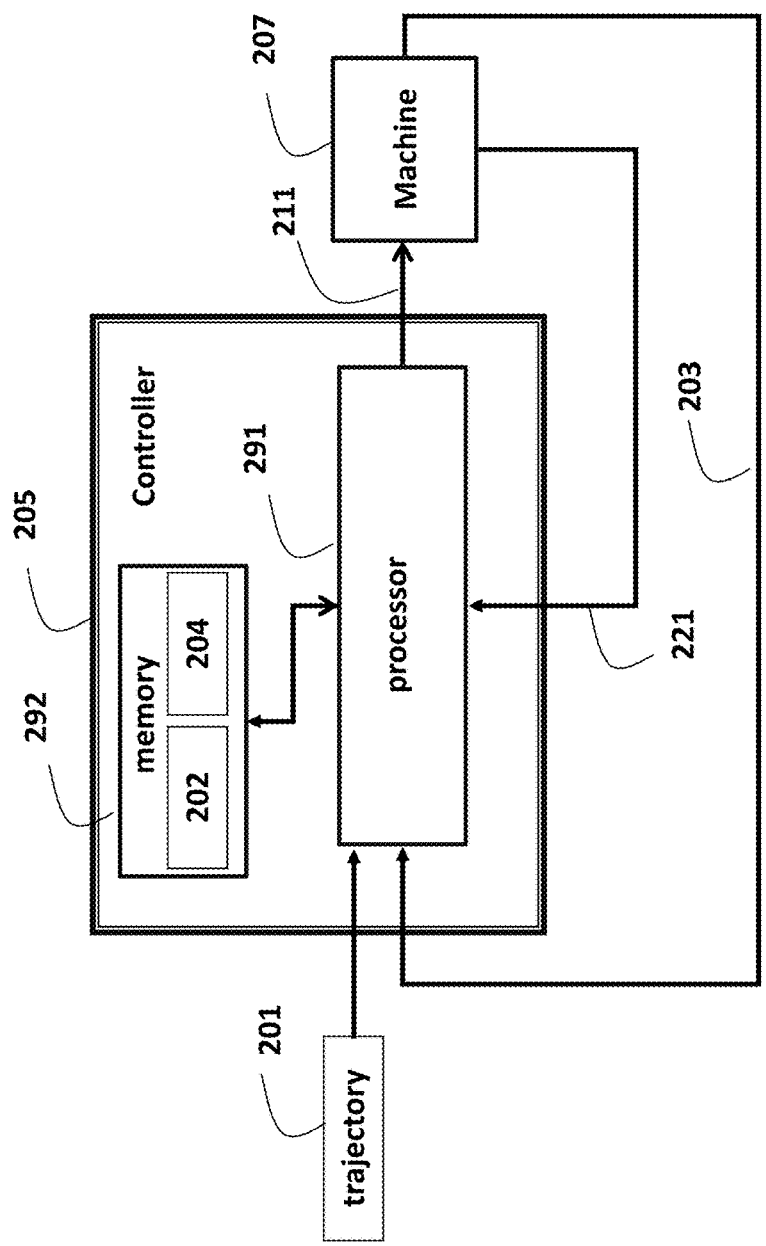
FIG. 2B is a block diagram of the controller according one embodiment of the invention.

FIG. 2B shows a block diagram of the controller 205 according to one embodiment of the invention. The controller 205 includes a processor 291 connected to a memory 292 for storing the model of the machine 202 and the constraints 204, such as constraints of the machine, e.g., physical and specification constraints, constraints on a transient of the reference trajectory and constraints on bounds of a tracking error. For example, the constraints on the transient of the reference trajectory can include a possible type of changes of the state of the reference trajectory, rates of the change of the state of the reference trajectory among others. The bounds of the tracking error can include the allowed difference between a function the state of the machine and a function of the state of the reference trajectory. The function can be, e.g., identity function, linear combination.

Figure 2C:
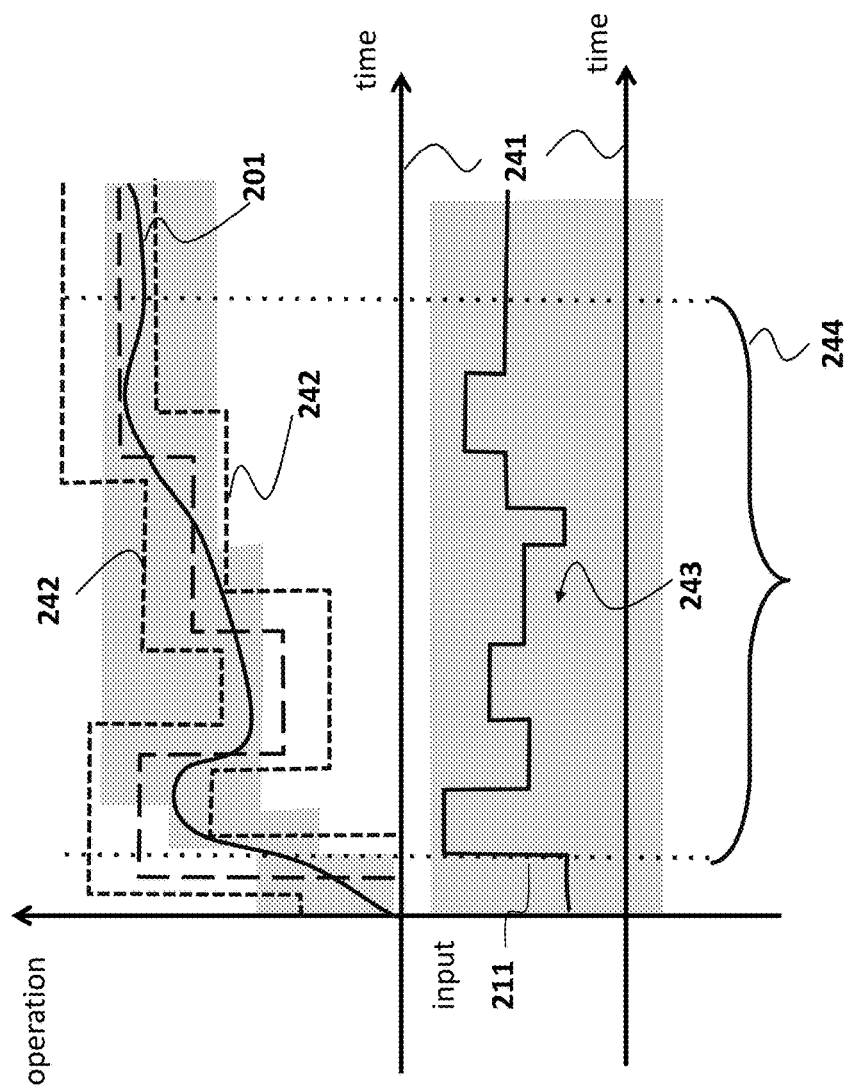
FIG. 2C is a timing diagram of the operation of the machine according to some embodiments of the invention.

FIG. 2C shows a timing diagram of the operation, e.g., motions, of the machine 207 according to some embodiments of the invention. The controller 205 generates the command 211 for the machine to perform the reference operation while enforcing the constraints 350. The controller at each time k 241, solves a finite time optimal control problem for a prediction interval 244, e.g., from the current time untill the N next times. The constraints can include constraints of the machine including regions of feasible states and outputs 242 and feasible command 243.

Some embodiments of the invention provide a system and a method for controlling operations of redundant processing machine including a fast actuator and a slow actuator for jointly positioning a worktool such as a laser beam according to a reference trajectory. The method according to various embodiments ensures a feasibility of the processing the reference trajectory satisfying constraints on the processing and movements of the actuators.

For example, some embodiments are based on recognition that a redundant laser processing machine can fail to process a given reference trajectory. For example, the reference trajectory can require the slow actuator to move with the speed exceeding its limitations. Accordingly, there is a need to modify the reference trajectory in the time domain, while preserving the reference trajectory in the spatial domain. For example, one embodiment increases the time of positioning the laser beam between at least some points of the reference trajectory to ensure the feasibility of the processing.

Some embodiments of the invention provide a method suitable for modifying the time domain of the reference trajectory in real time, i.e., concurrently with the controlling of the laser processing machine To that end, it was recognized that the time domain of the reference trajectory can be modified sequentially for each period of time. Such recognition allows selecting the period of time to be less than the entire duration of the reference trajectory based on, e.g., computational power of a processor of the laser processing machine to enable the processor to modify the time domain of the reference trajectory concurrently with the controlling the movement of the actuators.

Figures 3A, 3B:
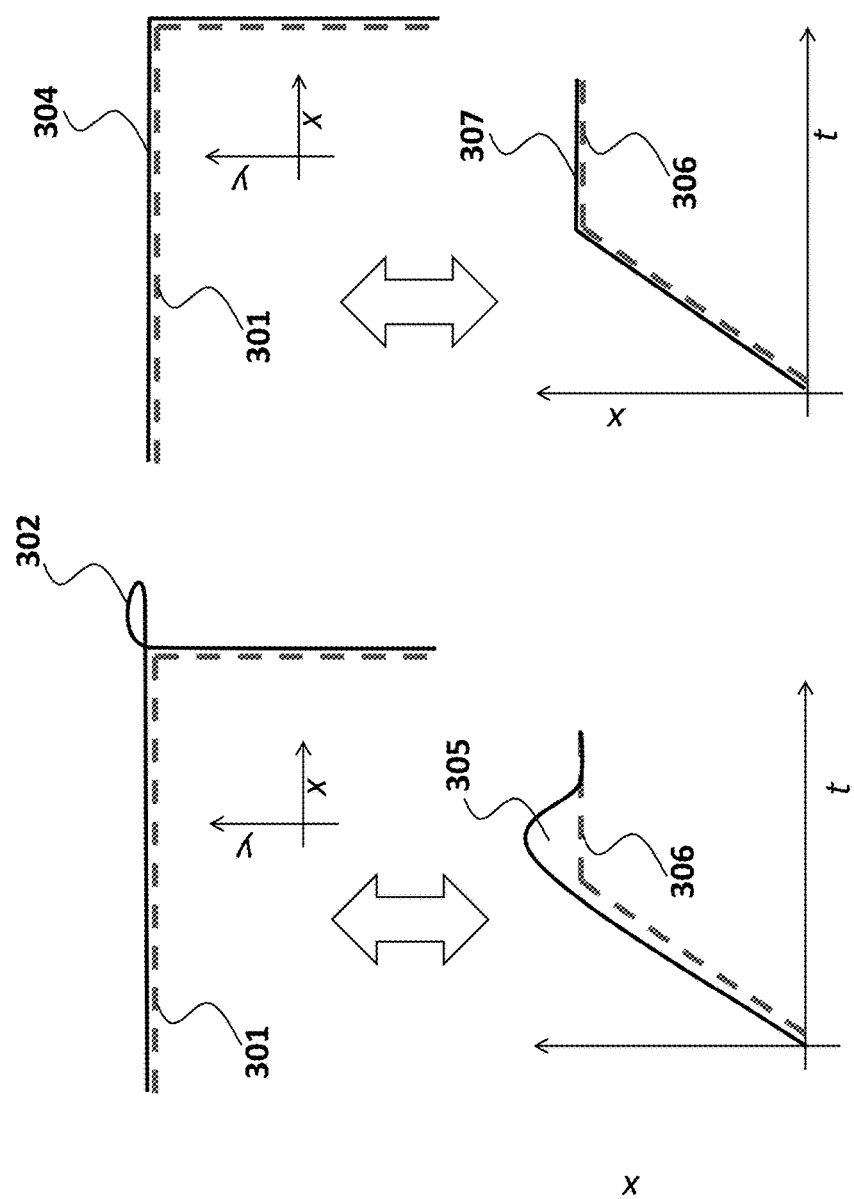
FIG. 3A and FIG. 3B are motion profiles of an actuator in spatial and time domains illustrating the problem addressed by some embodiments.

FIG. 3A and FIG. 3B show motion profiles of an actuator in spatial and time domains illustrating the problem addressed by some embodiments. FIG. 3A shows a pattern 301 of the processed points in space and a trajectory 306 of the processed points in time, only for the x axis. When reaching the corner, if the machine is processing sequentially at high speed and if the processing position is not properly stopped, then points 302 outside of the original pattern 301 are processed. The points 302 corresponds to points 305 on time trajectory, because by operating sequentially on portion of the pattern, the machine may not have enough time to come to a stop before processing points outside the pattern. Instead, under the same conditions, a machine that can stop the processing position can stop at the corner and hence can generate trajectory 304 with time trajectory 307 where no additional points other than those of the original pattern are processed. Thus, the capability to stop at the last processed point guarantees that no additional points other than those of the original pattern are processed.

Figure 3D:
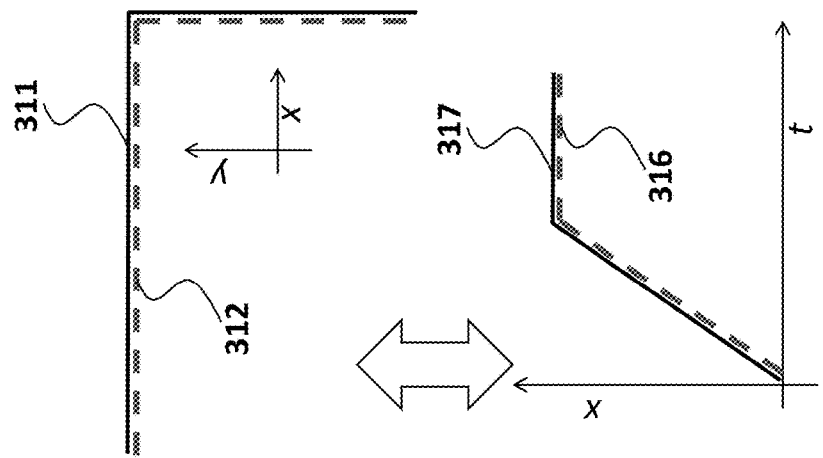
FIG. 3C and FIG. 3D are motion profiles of an actuator in spatial and time domains illustrating principles of the solution employed by some embodiments of the invention to jointly process a reference trajectory using redundant actuators.
Figure 3C:
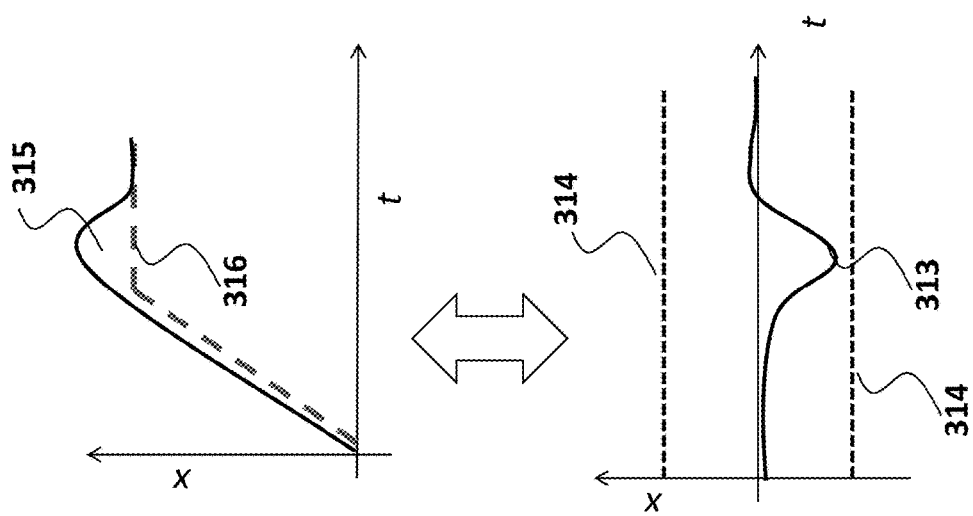

FIG. 3C and FIG. 3D show motion profiles of an actuator in spatial and time domains illustrating the principles of the solution employed by some embodiments of the invention to jointly process a reference trajectory using two actuators. Those embodiments are based on the realization that sequential real-time trajectory generation can be obtained by guaranteeing that the worktool can be stopped on a point of the pattern while the slow axis is moving, while compensating for such motion with the fast axis.

The slow actuator generates the motion profile 315 following the trajectory 316. The deviation is compensated by the motion profile of fast actuator 313 so that the combination of motion of fast and slow actuators results in joint profile 317, which results in pattern 311 for the reference trajectory 312. However, the fast actuator can compensate the deviation of the slow actuator only within its range denoted by the constraints 314.

Some embodiments of the invention are based on recognition that sequential processing and/or modification of the reference trajectory imposes two requirements for modifying each segment of the reference trajectory for the duration of each time period. The first requirement ensures the feasibility of processing the segment of the reference trajectory such that the constraints on the processing and the movements of the actuators are satisfied. This requirement follows from the initial objective of the embodiments to ensure the feasibility of processing the portion of the trajectory. However, the second requirement, which follows for the sequential processing of the reference trajectory, ensures that the processing of the segment of the trajectory does not move the laser processing machine in such a state that necessitate the violation of the constraints for processing any future portion of the trajectory. If these two requirements are satisfied, the sequential modification can generate the entire feasible reference trajectory.

Some embodiments of the invention are based on a realization that if the speed of processing of the portion of the reference trajectory places the processing machine in such a state that allows the processing machine to maintain the worktool at the last processed point for indefinite period of time without violation of the constraints, such speed allows the machine to adapt to any variation of the future portions of the reference trajectory. It was realized that the ability of dynamics of the processing machine to preserve its state after the current processing ensures that the processing does not jeopardize the future processing, and thus such a processing satisfies the second requirement.

Figure 4A:
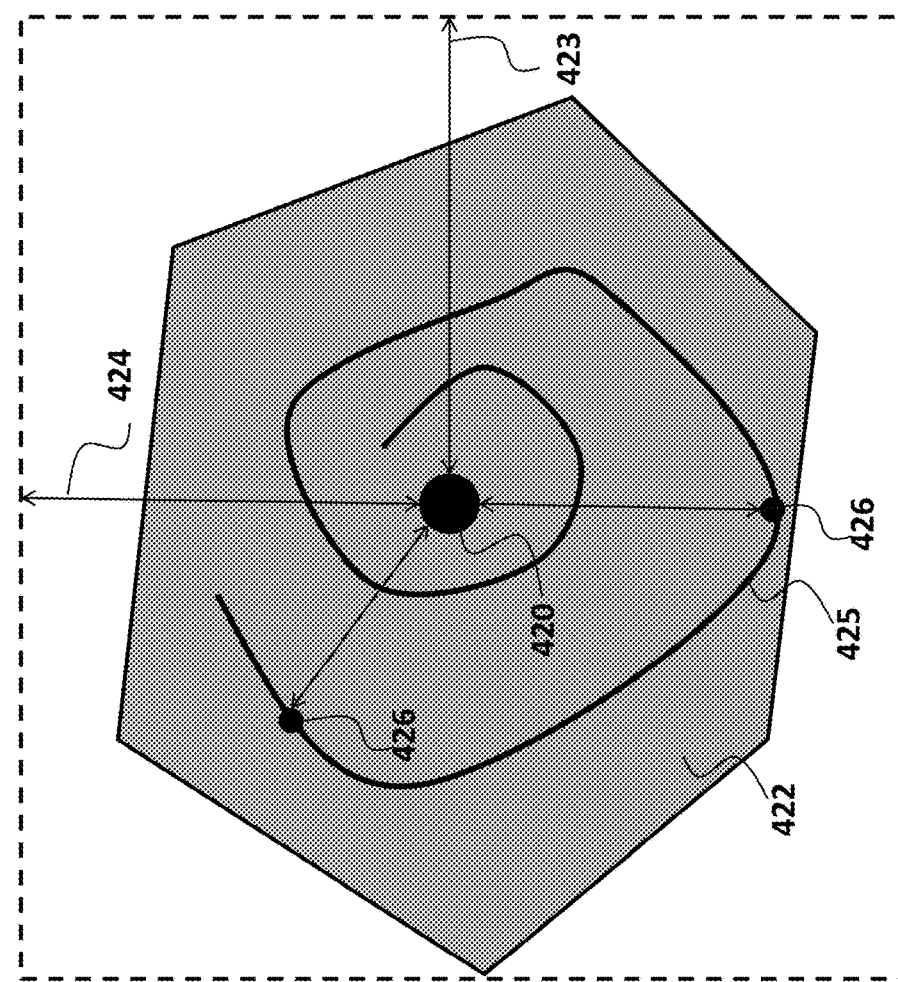
FIG. 4A is a schematic of positioning the worktool at a point while the slow actuator still moves and with a fast actuator subject to range constraints according to some embodiments of the invention.

FIG. 4A shows a schematic of positioning the worktool at a point 420 while the slow actuator still moves and with a fast actuator subject to range constraints. The region 422 is included in the range of the fast actuator 421, determined by its ranges along x 423 and y 424 axis. The region 422 is invariant for the slow actuator dynamics, meaning that the positions 425 of the slow actuator can be forced to remain in the area 422, so that the distance between the point 420 and any point selected from the positions 425, e.g., a point 426, is less than the range of the fast actuator 423 and 424.

Figure 4B:
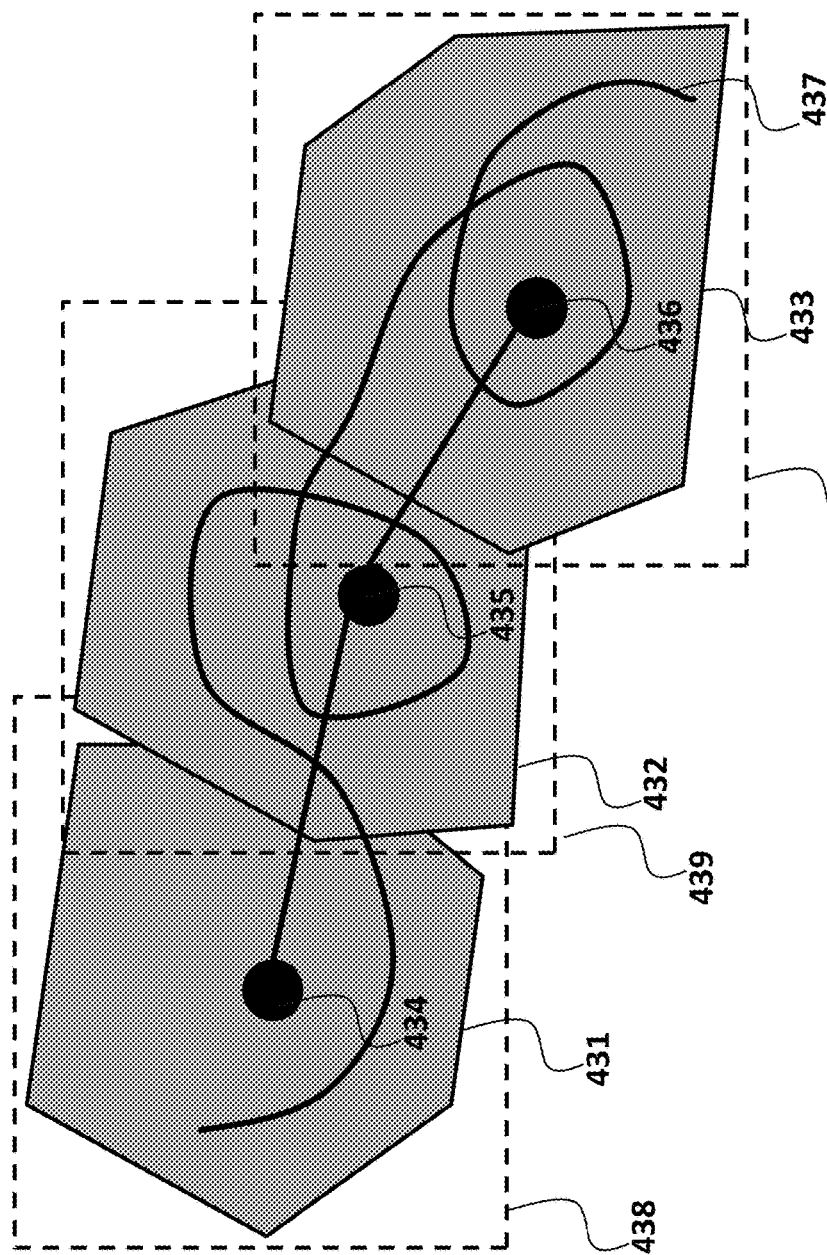
FIG. 4B is a schematic of positioning the worktool at a sequence of points according to some embodiments of the invention.

FIG. 4B shows a schematic of positioning the worktool at a sequence of points 434, 435, 436 to be processed such that the worktool can stop at any points of the sequence without violating the constraints. The positions of the slow actuator 437 is maintained in a sequence of invariant regions, 431, 432, 433 internal to the ranges of the fast actuators 438, 439, 440 centered at the points 434, 435, 436 to be processed.

Figure 5A:
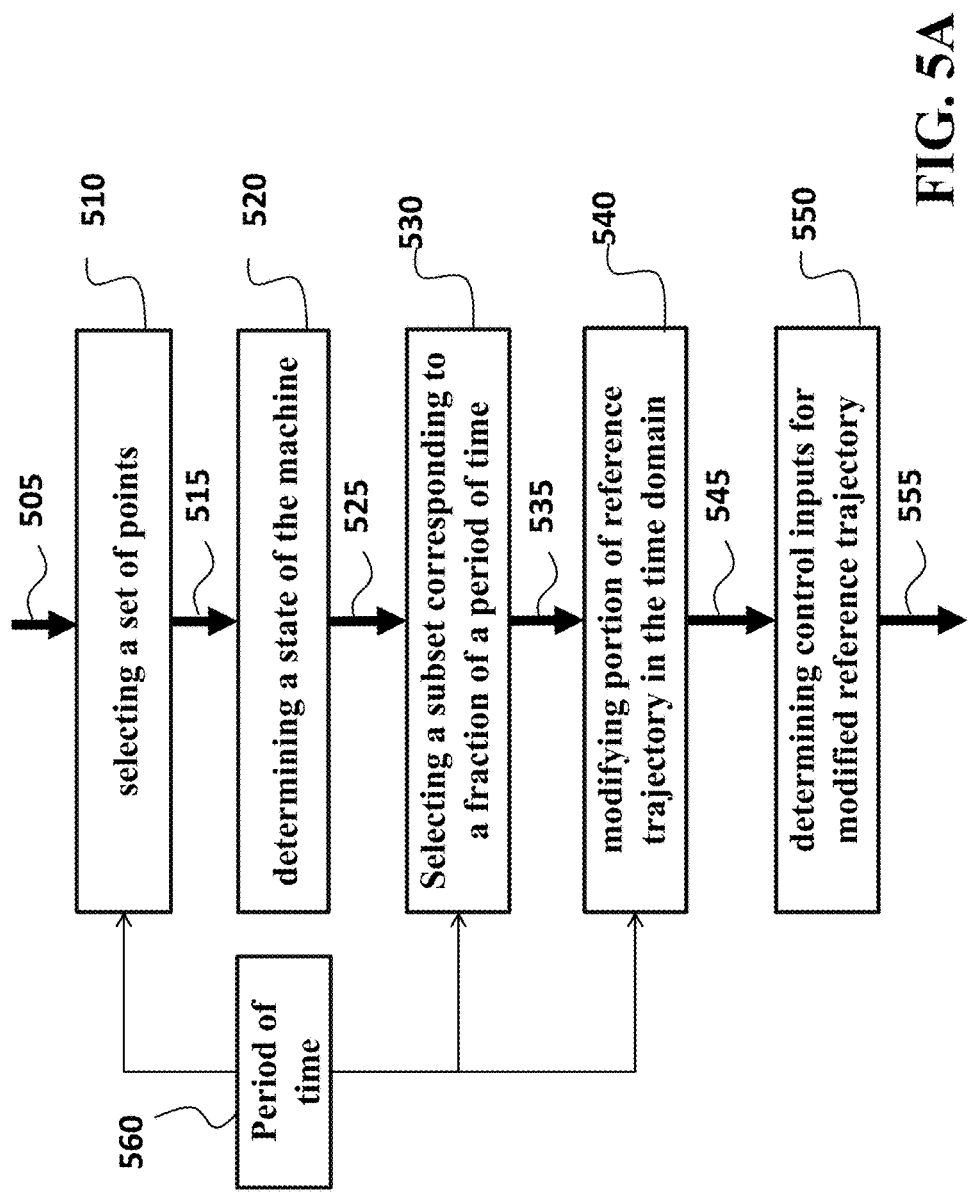
FIG. 5A is a block diagram of a method for controlling an operation of a processing machine including a fast actuator and a slow actuator for jointly positioning a worktool according to some embodiments of the invention.

FIG. 5A shows a block diagram of a method for controlling an operation of a processing machine including a fast actuator and a slow actuator for jointly positioning a worktool according to a reference trajectory. The reference trajectory 505 is defined in a spatial domain by locations of points for positioning the laser beam and defined in a time domain by a relative time for positioning the laser beam on each point. Steps of the method can be performed in real-time during the processing the trajectory by a processor of a controller of the processing machine.

The method selects 510 a set of points 515 forming a segment of the reference trajectory in the spatial domain corresponding to a period of time 560 in the time domain. For example, the segment for the set of points is less than the entire reference trajectory. For example, the points of the reference trajectory are continuous in the time domain and separated by a unit of time, e.g., 1 millisecond (ms).

The method determines 520 a state 525 of the processing. For example the state can be measured and/or estimated using a model of the processing machine. In different embodiments, the state 525 is a current state of the processing machine or a future state for the embodiments determining the trajectory over a prediction horizon.

The method selects 530, from the set of points 515 using the state 525 of the processing machine and locations of the points in the set, a subset of points 535 corresponding to a fraction of the period of time 560. The subset 535 includes less points than the set 515, and selected such that the processing machine can position the worktool at each point in the subset within the period of time and can maintain the worktool at least at the last point in the subset after the period of time while satisfying constraints on the positioning the worktool and movements of the actuators.

Figure 5B:
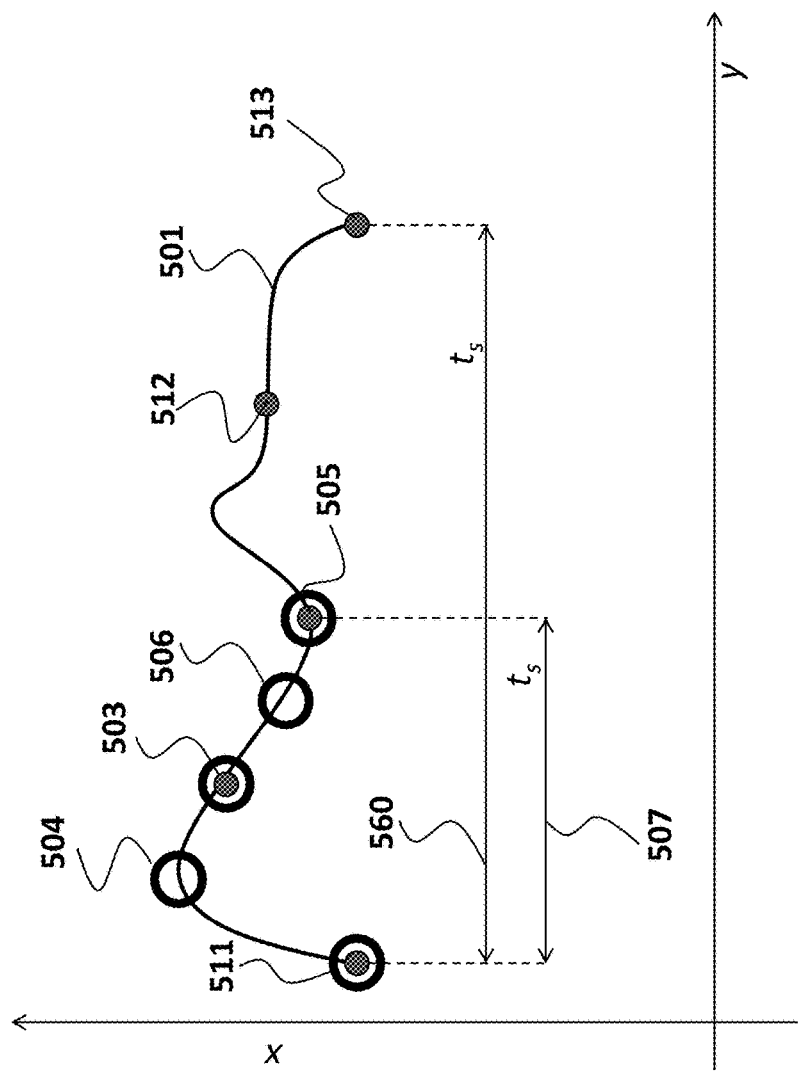
FIG. 5B is a plot illustrating the selection of the subset of points according to some embodiments of the invention.

FIG. 5B shows a plot illustrating the selection of the subset of points according to some embodiments. The segment 501 of the reference trajectory includes points 511, 503, 505, 512 and 513 forming the set of points 515 for the period of time 560. The point 505 is determined to be the last point that the processing machine can process within the period of time 560 with the speed allowing the machine to stop or to maintained the worktool at that point. Thus, the points 511, 503, and 505 corresponding to the fraction 507 of the period of time form the subset 535.

Next, the method modifies 540 the segment of the reference trajectory in the time domain by expanding units of time separating subsequent points in the subset of points to produce a modified segment 545 of the reference trajectory having the subset of points processed for the period of time. In such a manner, only subset of points is processed for the period of time previously required for processing the entire set of points. Thus, the processing speed is reduced.

In some embodiments, the modification includes sampling or resampling the sub-segment of the trajectory formed by the subset of points to preserve the original number of points in the set. In the example of FIG. 5B, new points 504 and 506 are introduced. Thus, instead of processing original points 511, 503, 505, 512 and 513 for the period of time 560, the modified trajectory requires processing points 511, 504, 503, 506 and 505 for the same period of time. The method determines 550 control inputs 555 to the fast actuator and the slow actuator using the modified segment of the reference trajectory.

Figure 5C:
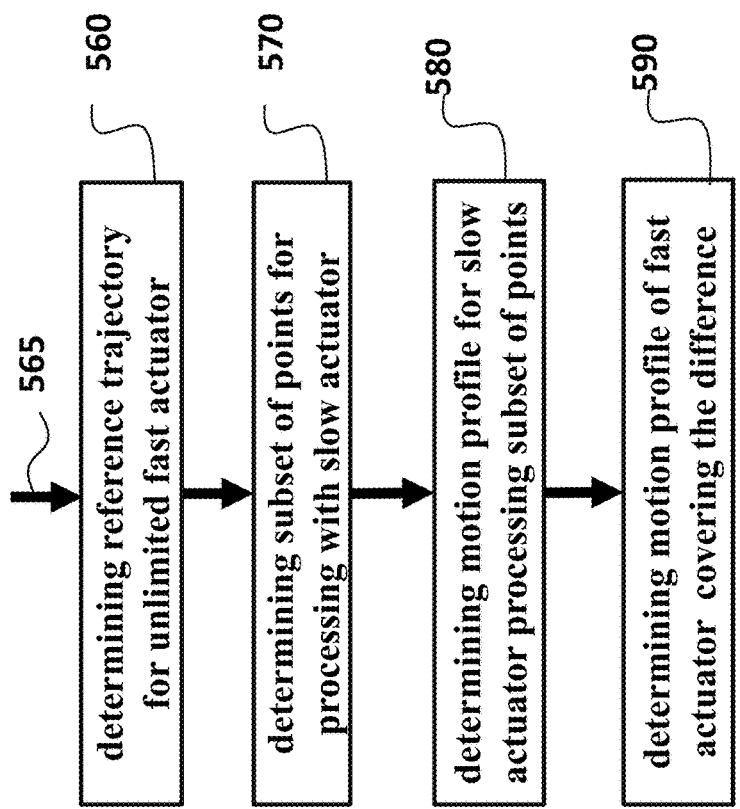
FIG. 5C is a flow chart of a method for determining the reference trajectory according to one embodiment of the invention.

FIG. 5C shows a flow chart of a method for determining the reference trajectory according to one embodiment of the invention. The embodiment determines 560 the spatial and the time domains of the reference trajectory for the processing pattern 565 based on motion of an actuator having acceleration and velocity constraints of the fast actuator and unlimited range of the motion. Such a reference trajectory is time efficient but can be infeasible. However, the reference trajectory can be modified based on a motion of the slow actuator having speed sufficient to maintain the position of the worktool around the point with an accuracy defined by the range of motion of the fast actuator. The modification of the reference trajectory based on dynamics of the slow actuator ensures feasibility of the modified reference trajectory, while preserving its efficiency.

Accordingly, the embodiment determines 570 the subset of points for processing within the period of time with motion of the slow actuator capable to maintain the position of the worktool around the point in the subset within the range of motion of the fast actuator. Such a motion of the slow actuator allows correcting difference between the state of the slow actuator and the reference trajectory using the fast actuator. Next, the embodiment determines 580 a motion profile for the slow actuator for processing the subset of points within the period of time with an accuracy defined by the range of motion of the fast actuator, and determines 590 a motion profile of the fast actuator based on a difference between the modified reference trajectory and the motion profile for the slow actuator.

Some embodiments of the invention test analytically the ability of maintaining the worktool at the points of the segment based on a combination of locations of the points of the segment of the trajectory and a state of the processing machine. For example, one embodiment determines a set of linear inequalities by constructing the subset of admissible machine states and locations of the points such that when the locations of the point are continuously provided as command to the slow actuator from a current point of time to any future time, the motion of the machine satisfies the constraints at any future time.

Accordingly, some embodiments determine the motion profile for the slow actuator by searching among points that satisfy constraints on the motion of the slow actuator to produce a set of motion profiles for the slow actuator, such that each motion profile for the slow actuator maintains the worktool position by the slow actuator in a sequence of invariant regions defined by the range of the motion of the fast actuator centered at corresponding points in the subset and selecting the motion profile for the slow actuator according to a metric of performance. For example, the metric of performance can be a processing time for processing the pattern, such that the motion profile for the slow actuator reduces the processing time.

Control Architecture for Coordinated Processing

Some embodiments implement the trajectory generation and control of the actuators by a specific real-time architecture that processes the reference trajectory feasible for the fast actuator motions but ignoring the fast actuator range for the fast actuators without range constraints. In order to obtain trajectories with high efficiency, i.e., fast processing of the desired pattern, it was realized the reference trajectory needs to be modified using information from the predicted motion of the slow actuator. In particular, from a segment of the reference trajectory, the fastest feasible reference trajectory for the slow actuator can be selected using a predicted future state of the slow actuator, thus ensuring the largest amount of points are processed, i.e., that the processing goes as fast as possible for the currently predicted conditions.

For example, one embodiment models the dynamics of the slow actuator as $$y_s^i(t)=T_s^i(t)*u_s^i(t), i\in\{x,y\}, \quad (1)$$

where the superscripts x and y refer to the x and y axis of the machine, * is the convolution operator in time, $y_s$ is the position of the slow actuator, $u_s$ is the position command to the slow actuator and $T_s$ is the transfer function of the slow actuator in time, which is of order greater or equal to two. The transfer function models at least two derivatives of the position to be asymptotically stable of unitary DC-gain, i.e., if the command is constantly equal to a value, the position of the actuator approaches the value infinitely close, in a possibly large amount of time.

The slow actuators are subject to constraints on position, acceleration, and velocity and command that can be expressed in the time domain as $$u_{s,min}^i \leq u_s^i(t) \leq u_{s,max}^i$$

$$p_{s,min}^i \leq y_s^i(t) \leq p_{s,max}^i$$

$$v_{s,min}^i \leq \dot{y}_s^i(t) \leq v_{s,max}^i$$

$$a_{s,min}^i \leq \ddot{y}_s^i(t) \leq a_{s,max}^i, i=\{x,y\}. \quad (2)$$

Similarly, one embodiment models the dynamics of the fast actuator in the frequency domain (Laplace domain) as $$y_f^i(t)=T_f^i(t)*u_f^i(t), i\in\{x,y\}, \quad (3)$$

where the superscripts x and y refer to the x and y axis of the machine, $y_f$ is the position of the slow actuator, $u_f$ is the position command to the slow actuator and $T_f$ is the transfer function of the slow actuator in time, which is of order greater or equal to two in order to model at least two derivatives of the position, and to be asymptotically stable of unitary dc-gain, i.e., if the position command is constantly equal to a value, the position of the actuator approaches the value infinitely close, in a possibly large amount of time.

The fast actuators are subject to constraints on position, accelerations and velocity and command that can be expressed in the time domain as $$u_{f,min}^i \leq u_f^i(t) \leq u_{f,max}^i$$

$$p_{f,min}^i \leq y_f^i(t) \leq p_{f,max}^i$$

$$v_{f,min}^i \leq \dot{y}_f^i(t) \leq v_{f,max}^i$$

$$a_{f,min}^i \leq \ddot{y}_f^i(t) \leq a_{f,max}^i, i=\{x,y\}. \quad (4)$$

The feasible trajectory of the points to be processed is described as a time trajectory $$r^i(t), i=\{x,y\} \quad (5)$$

which imposes the combined slow and fast actuator constraint $$y_s^i(t)+y_f^i(t)=r^i(t), i=\{x,y\} \quad (6)$$

Because, in some embodiments, the fast actuator is moving much faster than the slow actuator such constraints are simplified into $$p_{f,min}^i \leq y_s^i(t)-r^i(t) \leq p_{f,max}^i, i=\{x,y\}, \quad (7)$$

which indicates that the difference between the positions of the points to be processed and the slow actuator position is smaller than the range of the fast actuator, so that the combination of slow and fast actuator can be placed at the positions of the points to be processed.

Some embodiments of the invention determine the reference trajectory for the processed points of the machine by first obtaining a first trajectory for the processed points based on abilities of the fast actuator, $$q^i(t), i=\{x,y\} \quad (8)$$

and then modifying the trajectory of Equation (8) depending on the characteristic of the processed points motion and on the state of the slow actuator such that the combination of the slow actuator and fast actuator can process such trajectory. Such a modification determines the trajectory of Equation (5) such that processing is guaranteed to satisfy the constraints of Equations (2), (4), (7). For instance, the first trajectory of Equation (8) can be generated by ignoring the range constraints of the fast actuator to represent the operation of an ideal machine with infinitely large range for the fast actuator. The first trajectory is then the fastest that the machine can process the pattern, but is not feasible due to ignoring the range constraints of the fast actuators. Then, the trajectory of Equation (5) is generated by modifying in real-time the first trajectory (8) to make the modified trajectory feasible, based on the processed point motion and on the state of the slow actuator, so that the range constraints of the fast actuator can be satisfied.

Figure 6:
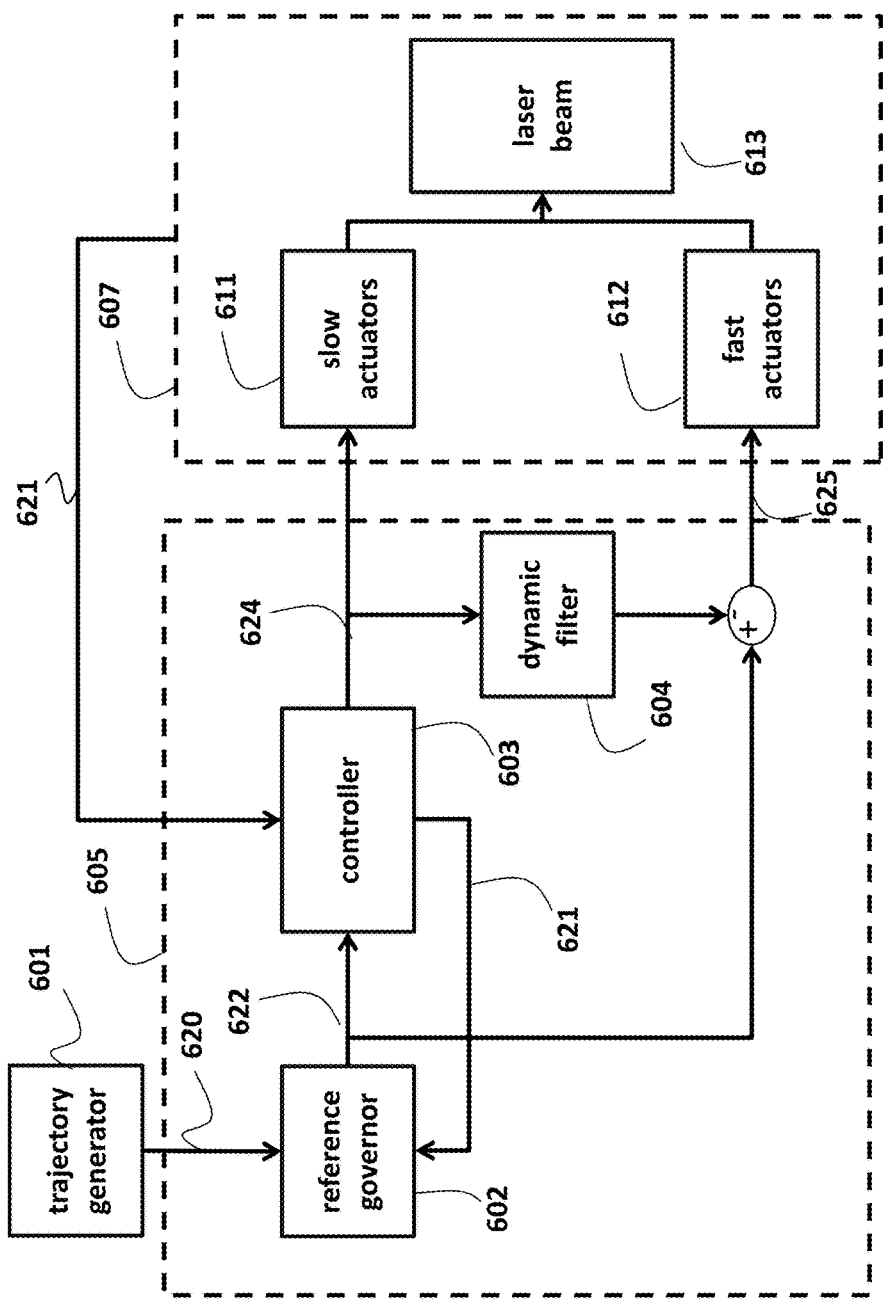
FIG. 6 is a block diagram of a control system for coordinated control of redundant processing machine according to some embodiments of the invention.

FIG. 6 shows a block diagram of a control system 605 for coordinated control of redundant processing machine 607, such as a laser processing machine, including the slow actuator 611 and the fast actuator 612 for jointly positioning the worktool, e.g., a laser beam 613. The trajectory generator module 601 generates a reference trajectory 620 based on the characteristics of the fast actuator, while ignoring the range constraints of the position of the fast actuator to achieve the spatial pattern of the processed points. The reference trajectory 620 is the fastest, but potentially infeasible.

Segments of the trajectory 620 is provided to a reference governor module 602 that based on a predicted state 621 of the slow actuator generates a modified trajectory 622 as described above. In some embodiments, the modified trajectory 622 is the fastest moving trajectory such that the motion of the combined slow and fast actuators can achieve while satisfying constraints of Equations (1)-(4), (7) and maintaining the spatial shape of the processed point to be the same as for trajectory of Equation (8). The modified trajectory 622 is provided to a controller 603 that using the state of the machine 621 selects a current command 624 for motion the slow actuators 611. The command for the fast actuators 612 is obtained by subtracting from the modified trajectory the command for the slow actuators 624 filtered by a filter 604. The commands to the fast and slow actuators cause movements of the actuators that determine the motion of the laser beam 613. Because the constraints (1)-(4), (7) are satisfied and the modified trajectory has the same spatial pattern than the original reference trajectory, the machine processes the desired spatial pattern while moving as fast as possible within its physical and operational limitations.

Generation of Reference Trajectory from Spatial Pattern

One embodiment generates the initial reference trajectory of Equation (8) from the spatial pattern of points $\{(p^x(i),p^y(i))\}_{i=1}^{np}$ to be processed by the machine. Different techniques can be used to generate the reference trajectory while ignoring the slow actuator and the range constraints of the fast actuator. For instance given maximum value of processing tracking error, processing velocity, and processing acceleration of the fast actuator, $\epsilon_e$, $\epsilon_v$, $\epsilon_a$ the maximum rate of motion $Dr_{max}$ of the reference trajectory to satisfy those bounds are computed as $$Dr_{max} = \max\left\{\frac{\varepsilon_e}{G_e}, \frac{\varepsilon_v}{G_v}, \frac{\varepsilon_a}{G_a}\right\},$$

where $G_e$, $G_v$, $G_a$ are worst case gains for tracking error, velocity, and acceleration which are computed for example for the fast actuator, from Equation (3). Thus, the trajectory from processing point $(P^x(i), p^y(i))$, processed at time $t_i$ to the next point $(p^x(i+1))p^y(i+1))$ is computed by first computing the shortest travel time $$t_{i,i+1} = \max\left\{\frac{|p^x(i+1) - p^x(i)|}{Dr_{max}}, \frac{|p^y(i+1) - p^y(i)|}{Dr_{max}}\right\}$$

and then by computing the trajectory of Equation (5) such that $$r^x(t_i) = p^x(i), r^y(t_i) = p^y(i),$$

$$r^x(t_i + t_{i,i+1}) = p^x(i+1), r^y(t_i + t_{i,i+1}) = p^y(i+1).$$

Optionally, the intermediate points of the first trajectory can be generated, for instance, by linear interpolation.

Reference Governor

The slow axis with dynamics of Equation (1) can be represented in state space and in discrete time with period $t_s$ as $$x^i(k+1) = A^i x^i(k) + B^i u_s^i(k)$$

$$y_s^i(k) = C^i x^i(k), i \in \{x,y\}, \qquad (9)$$

where k is a time instant when the signals are sampled, i.e., the index of the control cycle, u is the machine input, y is the machine output, x is the state of the machine, and A, B, C, are parameters of the model. For example, $x = [y_s \, \dot{y}_s \, \ddot{y}_s]'$ and A, B, C are matrices of appropriate dimensions. It is realized that for model (9) obtained from (2) if the trajectory (5) is used as the input to the slow actuator model (9), i.e., $r^i(k) = u_s^i(k)$, $i = \{x,y\}$.

The constraints (2) and (10) can be written as $$x_{min}^i \leq x^i(k) \leq x_{max}^i$$

$$u_{s,min}^i \leq u_s^i(k) \leq u_{s,max}^i$$

$$p_{f,min}^i \leq Cx^i(t) - u^i(t) \leq p_{f,max}^i \; i=\{x,y\} \qquad (10)$$

Figure 7:
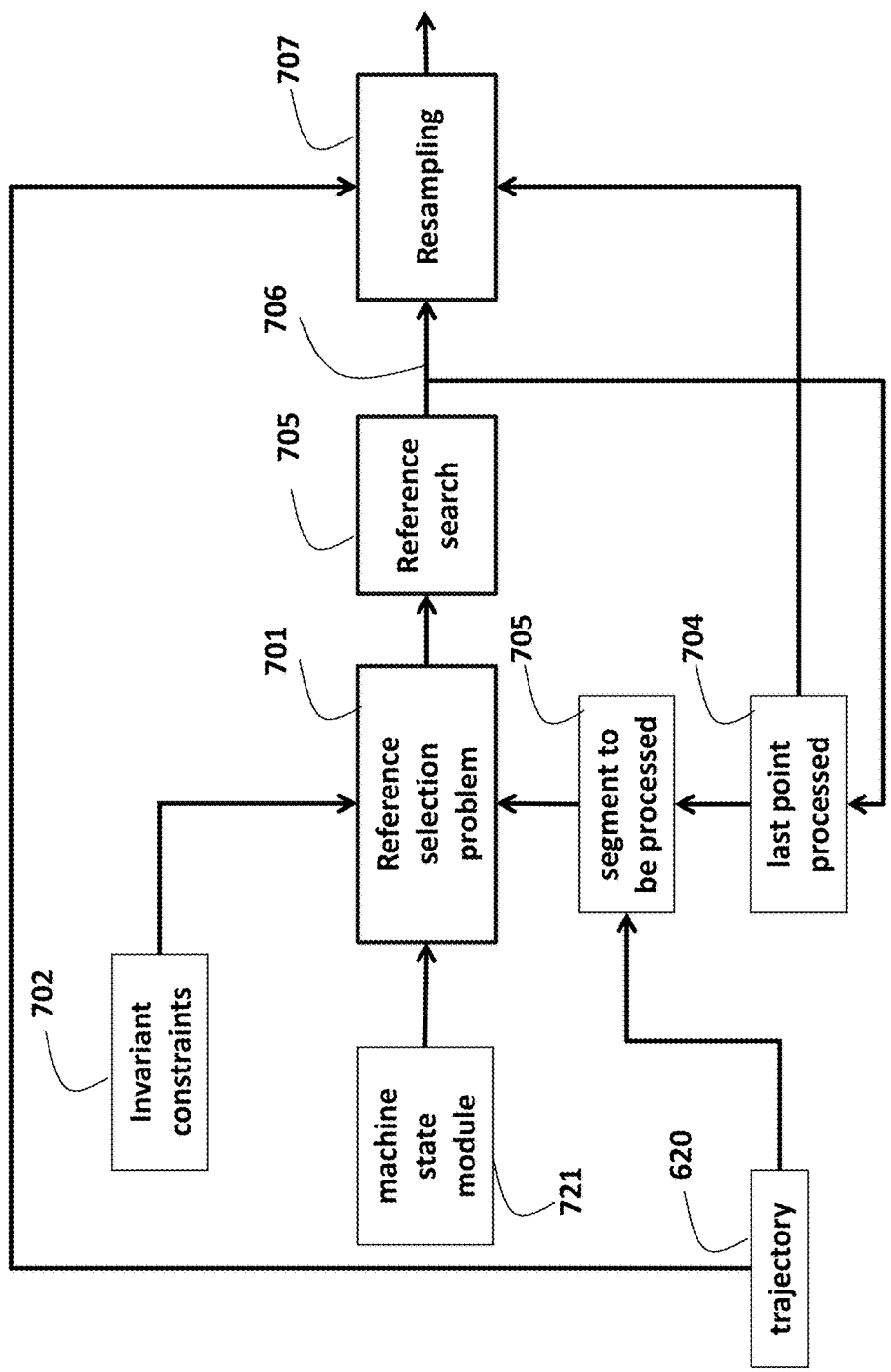
FIG. 7 is a block diagram of a reference governor modifying sequentially the reference trajectory according to one embodiment of the invention.

FIG. 7 shows a block diagram of the reference governor 602 modifying sequentially the reference trajectory according to one embodiment of the invention. The reference governor operates by cycles of duration $t_s$. At every cycle indexed by k, the machine processes P points each time, spaced by $t_f$ seconds, where $t_s = t_f P$ that covers the time interval between $t_s(k-1)$ and $t_s k$. The reference governor 602 determines the segment of P points in the trajectory, to be processed 705 in the current time period $i_s$ from the reference trajectory 620. The reference governor determines the last processed point 704 in the segment, such as the point 505 defining the subset of points according to $$\{(\hat{q}^x(j), \hat{q}^y(j))\}_{j=0}^P, \qquad (11)$$

where $(\hat{q}^x(0), \hat{q}^y(0))$ is the last processed point.

The segment of points to be processed 705, the predicted state of the machine $\hat{x}^i$, $i \in \{x,y\}_{721}$ at the beginning of the cycle when the points need to be processed, and the invariant constraints 402 are used to formulate the reference selection problem 701 according to $$H_{inv}^i \hat{x}^i + S_{inv}^i u_s^i \leq K_{inv}, \; i \in \{x,y\} \qquad (12)$$

The reference selection problem 701 is searched 705 to determine the largest subset or sub-segment of points that can be processed subject to invariant constraints 702 that guaranty satisfying Equations (1), (2), (7) using a single command for the slow actuator according to $$M = \max_{j \in [0,P]} j \qquad (13)$$

$$s.t. \quad H_{inv}^x \hat{x} + S_{inv}^x \hat{q}^x(j) \leq K_{inv}^x,$$

$$H_{inv}^y \hat{x} + S_{inv}^y \hat{q}^y(j) \leq K_{inv}^y,$$

The reference governor also guarantees that if the single actuator command is maintained forever, the laser beam can be always directed to the last point of the sub-segment, thus ensuring that the processing position can be stopped with no additional point outside of the original patter In one embodiment, the reference selection problem is solved by a reference search 705. Because only a mono-dimensional value is sought, many efficient implementations are possible for solving the problem (13). For instance, one embodiment initializes M=0 and at every iteration to check if j=M+1 satisfies the inequality conditions. If so, M=M+1, and the operations are repeated until either M=P or the inequality conditions are not satisfied.

Alternatively, one embodiment can initialize j=P and at every iteration try to check if j satisfies the inequality conditions. If so or if M=0, the embodiment stops the iterations, otherwise the embodiment sets j=M-1 and the iterations are repeated.

Additionally or alternatively, one embodiment performs a bisection search. If j=P satisfies the inequality conditions, then M=P and the algorithm stops. Otherwise, initialize $j_f=0$, and we let $j_u=P$. Then the embodiment sets $j=\text{round}(j_f+j_u/2)$ and checks if the inequality conditions are satisfied. If so, $j_f=j$, otherwise $j_u=j$. The embodiment stops when $(j_u-j_f)<2$ and sets M=j.

The index M determines the final point of the largest subsegment 706 that can be processed $(\hat{q}^x(M), \hat{q}^y(M))$. From the final point of the largest subsegment of points that can be processed 706, the current last point 704, and the trajectory 620, P points are generated by a resampling 707 with time spacing $t_f$ seconds, according to $$\{(\tilde{r}^x(j), \tilde{r}^y(j))\}_{j=0}^P,$$

$$(\tilde{r}^x(0), \tilde{r}^y(0)) = (\hat{q}^x(0), \hat{q}^y(0)),$$

$$(\tilde{r}^x(P), \tilde{r}^y(P)) = (\hat{q}^x(M), \hat{q}^y(m)), \qquad (14)$$

between the last processed point 704 and the final point of the largest subsegment of points that can be processed 7406.

The resampled points are sent as modified reference for the time interval when $\{(\hat{q}^x(j)), \hat{q}^y(j))\}_{j=0}^P$ need to be processed. The modified reference can be associated with a processing time instant and result in a modified segment of the trajectory of Equation (5) during time interval between $t_s(k-1)$ and $t_s k$.

In this way the processing speed of the modified trajectory is reduced without changing the shape of the trajectory itself. The original trajectory processed P points at a certain distance in space in $t_s$ seconds. If between the current laser point 704 and the final point of the largest subsegment of points that can be processed 706 there are only MSP points of the original trajectory, the length accomplished in $t_s$ seconds by the modified trajectory is shorter. Thus, by resampling the M points into P>M points with time spacing $t_f$ seconds, still processes P points with time spacing $t_f$ seconds, but these points are closer to each other because the total distance is shorter. Thus shorter distance in the same amount of time results in the processing having slowed down the reference trajectory speed to a level that can be executed by the machine with multiple actuators subject to constraints.

Referring back to the example of FIG. 5B, the points of $\{(\hat{q}^x(j)), \hat{q}^y(j))\}_{j=0}^{P}$ are shown in the same shape as a shape of the point 503. The point 511 is the last processed points $(\hat{q}^x(0), \hat{q}^y(0))$. Thus, P=4. The point $(\hat{q}^x(M), \hat{q}^y(M))$ is 505, thus for the current iteration M=2. The points of $\{(\hat{r}^x(j), \hat{r}^y(j))\}_{j=0}^{P}$ are 506, and two new points are added by resampling. Note that the points denoted as 503 are supposed to be processed in time $t_s$, but instead, the points denoted as 506 are processed in time $t_s$. Because the distance among the points 506 is less than those among the points denoted as 503, the velocity of processing is decreased. The point $(\hat{q}^x(M), \hat{q}^y(M))$ is set to be the last processed point 504 for the subsequent iteration.

Figure 8:
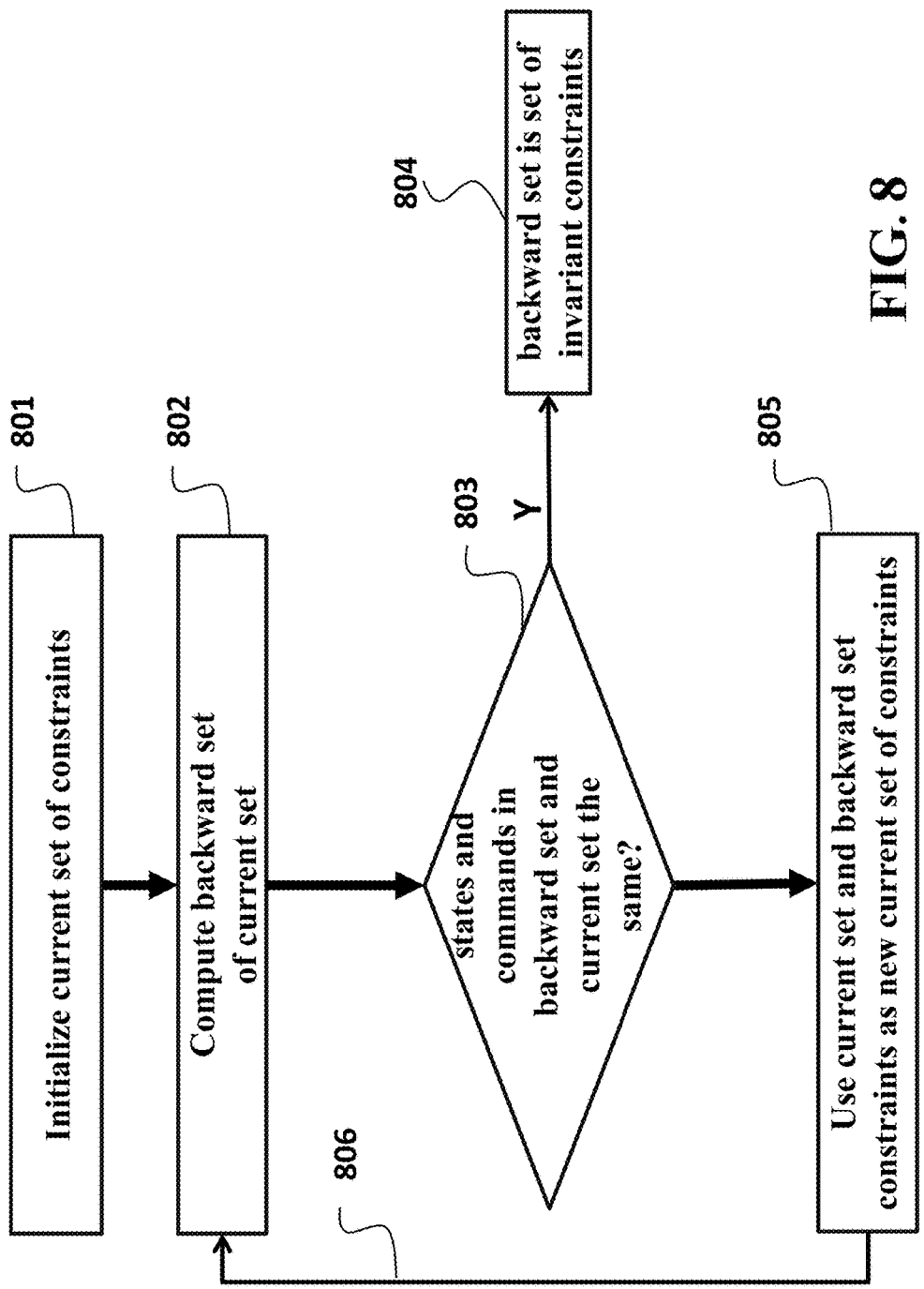
FIG. 8 is a block diagram of a method for determining invariant constraints according to one embodiment of the invention.

FIG. 8 shows a block diagram of a method for determining the invariant constraints 702 according to one embodiment. In one embodiment, the invariant constraints are constructed from dynamics of the slow actuator for all couples $(x^i, u_s^i)$, $i \in \{x,y\}$ of slow actuators states and slow actuator commands such that if the command is applied from the state of the machine, the actuator dynamics satisfies the constraints (2), and the constraint (7), where a. $r^i(t) = u_s^i$, $\forall t$, $i \in \{x,y\}$.

For example, a current set of constraints is initialized 801 as the constraints (2), and (7) where $r^i(t) = u_s^i$, $\forall t$, $i \in \{x, y\}$. From the current set of constraints, a set of constraints determining the backward reachable set is computed 802 as the constraints that determine the states and constant commands that after a one-step evolution of the system dynamics (1) satisfy the current set of constraints. If 803 the set of states and commands described by the backward reachable set includes or equals the set of states and commands described by the current set, then 804 the current set of constraints is the set of invariant constraints. Otherwise 805, the set of constraints determining the backward reachable set and the current set of constraints together are used as the new current set of constraints, in a repetition 806 of the method.

Model Predictive Control for Coordinated Processing

The reference obtained from the reference governor can be applied directly to the laser processing machine. This guarantees that all the constraints are satisfied, and hence, that the pattern is processed correctly. However, the constraint on the ability to maintain the laser beam on each point of the modified portion can make the modified portion of the reference trajectory abrupt in the time domain. To address this problem one embodiment uses the modified portion of the reference trajectory in MPC control that uses the modified portion only as part of the prediction horizon. In this embodiment, the state of the machine is a future state, and the embodiment predicts that future state.

A model predictive control algorithm provides a controller that satisfies constraints of Equations (2), (4), (7) and operates sequentially, when the trajectory is obtained as a modification of Equation (8) such that the combination of the slow actuator and fast actuator can process such trajectory. Thus, some embodiments use the controller 603 as predictive controller to ensure optimization of secondary objectives such as energy consumption or reduction of vibrations of the machine, which improves the pattern quality.

Figure 9:
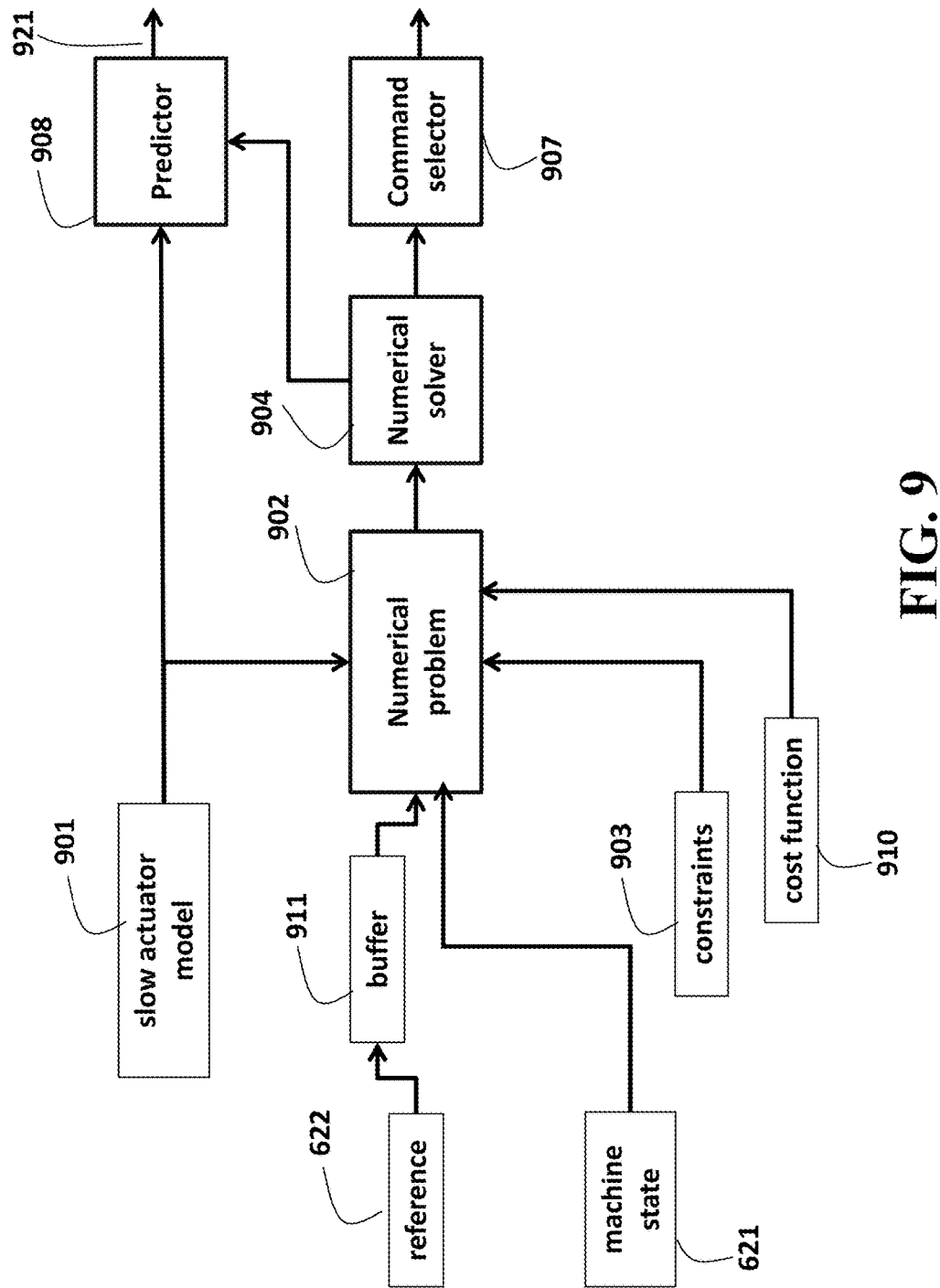
FIG. 9 is a block diagram of a predictive controller according to one embodiment of the invention.

FIG. 9 shows a block diagram of the predictive controller 603 according to one embodiment of the invention. In this embodiment, the predictive controller 603 is a model predictive controller that uses a cost function 910, a model 901 of the slow actuator, the constraints 903, e.g., the constrains of Equations (10), (14), the machine state 621, a sequence of future points of the modified trajectory 622 determined by the reference governor 602 and stored in a buffer 911 to construct a numerical problem 902 which represent the future behavior of the machine along a future horizon of length $t_s N$ seconds. The numerical problem 902 is solved by a numerical solver 904 to obtain a sequence of future commands for the machine inputs the first of which is selected 907 as command for the slow actuator, while all future commands together with the actuator model and the machine state are used to predict the future slow actuator state 908 at the end of the prediction horizon 921 used by the reference governor to generate a new point of the modified trajectory.

At time interval between $t_s(k-1)$ the numerical problem of the MPC is $$\min_{U_k} x_{N|k}^{i\prime} P^i x_{N|k}^i + \sum_{j=0}^{N-1} x_{j|k}^{i\prime} Q^i x_{j|k}^i + \quad (15)$$

$$\Delta u_{s,j|k}^{i\prime} R^i \Delta u_{s,j|k}^i + (y_{s,j|k}^i - r_{j|k}^i)' G^i (y_{s,j|k}^i - r_{j|k}^i)$$

s.k. $x_{j+1|k}^i = A^i x_{j|k}^i + B^i u_{s,j-1|k}^i + B^i \Delta u_{s,j|k}^i$ $y_{s,j+1|k}^i = C^i x_{j|k}^i$ $u_{s,j|k}^i = u_{s,j-1|k}^i + \Delta u_{s,j|k}^i$ $x_{min}^i \leq x_{j|k}^i \leq x_{max}^i$ $u_{s,min}^i \leq u_{s,j|k}^i \leq u_{s,max}^i$ $p_{f,min}^i \leq C x_{j|k}^i - r_{j|k}^i \leq p_{f,max}^i$ $H_{inv}^i x_{N|k}^i + S_{inv}^i r_{N|k}^i \leq K_{inv}$ $x_{0|k}^i = x^i(k)$ $u_{s,-1|k}^i = u_s^i(k-1)$ $r_{j|k}^i = r^i(k+j)$ for each $i = \{x,y\}$, where $P^i$, $Q^i$, $R^i$, are symmetric positive semi-definite matrices, and $U_k^i = [u_{s,0|k}^i \ldots u_{s,N-1|k}^i]$ Numerical problem (15) can be solved by a quadratic programming algorithm to obtain the optimal input sequence $U_k^{i*} = [u_{s,0|k}^{i*} \ldots u_{s,N-1|k}^{i*}]$, where the first element $u^i(k) = u_{s,0|k}^{i*}$ is used as current command to the machine slow actuator during time interval between $t_s(k-1)$ and $t_s k$.

Combining Predictive Controller with Reference Governor

Note that in the numerical problem (15), future references are generated, which means that the reference governor needs to generate a number of points before the predictive controller problem is solved. Thus, the reference governor generates future points at the end of the prediction horizon of the predictive controller based on the slow actuator state predicted by the predictor 908.

Figure 10:
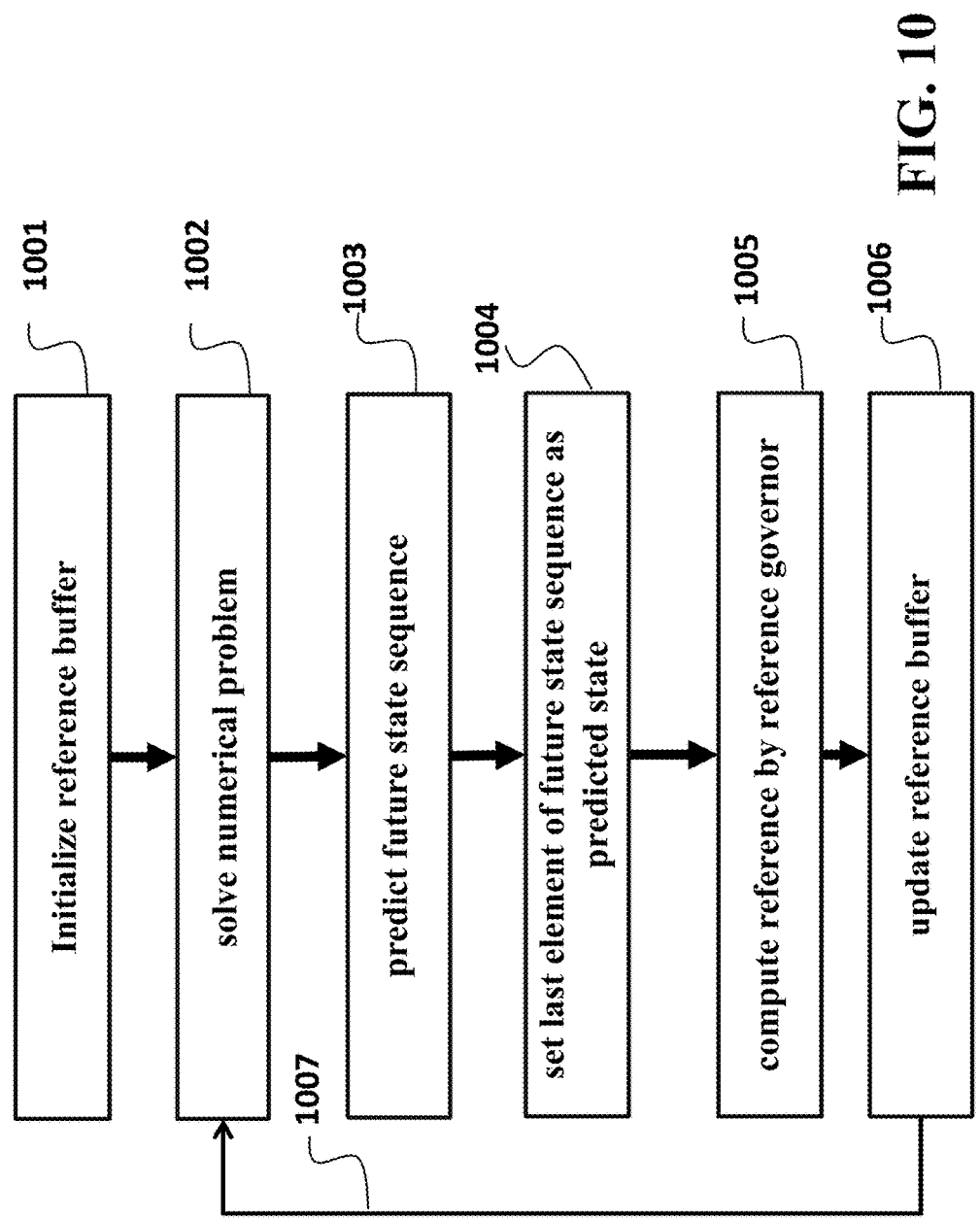
FIG. 10 is a flow chart of a method for combining operations of different components of a control system according to one embodiment of the invention.

FIG. 10 shows a flow chart of a method for combining the operations of the reference governor, the predictor, and the predictive controller according to one embodiment of the invention. The future references from time $kt_s$ are stored in the buffer 911 $\mathbb{R}_k=[r_{0|k}^i \ldots r_{N|k}^i]$. The buffer is initialized 1001 with a given initial reference $r_{0|0}^i=r(0)^i$. The reference governor is executed N times, where initially $\hat{x}=x(0)$, being the given initial state of the slow actuator, to determine $r^i(t)$ in Equation (5) for the time interval between 0 and $t_s$. The value $r_{1|0}^i=r^i(t_s)$ is added to the buffer, and Equation (9) is evaluated from $x(0)$ with $u^i(0)=r^i(t_s)$ to determine the predicted state value $\hat{x}_{1|0}$ which is used as new state for the reference governor $\hat{x}_{1|0}=\hat{x}$, to compute $r^i(t)$ in Equation (5) for the time interval between $t_s$ and $2t_s$. Then, $r_{2|0}^i=r^i(2t_s)$ is added into the buffer. The process is repeated until the buffer has all the N+1 elements needed.

After the buffer has been initialized, the method begins an iterative operation where the buffer $\mathbb{R}_k=[r_{0|k}^i \ldots r_{N|k}^i]$ is used 1002 with the slow actuator state $x^i(k)$ to build and solve problem (15). Then, the predictor 908 uses model (9) with solution of (15), $u_k^{i*}=[u_{s,0|k}^{i*} \ldots u_{s,N-1|k}^{i*}]$ to predict 1003 the future state sequence $x_k^{i*}=[x_{1|k}^{i*} \ldots x_{N|k}^{i*}]$. Then, the last element 1004 of $x_k^{i*}$ is selected as the output 621 of the predictor controller 603, which is used 1005 in the next step of the reference governor, i.e., $\hat{x}=x_{N|k}^{i*}$. Thus, the reference governor computes the reference in the time interval between $t_s(k+N-1)$ and $t_s(k+N)$. The buffer is updated 1006 by eliminating the oldest value and by adding the value computed by the reference governor obtaining $\mathbb{R}_k=[r_{0|k+1}^i \ldots r_{N|k+1}^i]$, where $r_{j|k+1}^i=r_{j+1|k}^i$, $j=1, \ldots, N-1$, and $r_{N|5}^i=r^j((N+k)t_s)$ In some embodiments of this invention the predictive controller is not used. In this case, the command to the slow actuator is simply set to be $u_s^i(k)=r^i(kt_s)$ and the next predicted state is $\hat{x}(k+1)=A^ix^i(k)+B^ir^i(kt_s)=x(k+1)$.

Generation of Control Inputs for Fast Actuator

Some embodiments enforce the constraints of Equation (6) to correctly process the trajectory. Thus, from the command to the slow actuator 624, the slow actuator 611 with dynamics of the model of Equation (1) and the fast actuator 612 with dynamics of the model of Equation (3), the command of the fast actuator 625 is generated. The constraints of Equation (6) are enforced, if the control inputs placing the fast axis 625 at the position are determined as $$u_f^i(t)=W_f^i(t)*r^i(t)-W_s^i(t)*u_s^i(t)$$

where $W_f(t)$, $W_s(t)$ are filters 604 designed to make sure that the constraint in (6) is satisfied for any slow actuator control $u_s^i(k)=u_{s,0|k}^{u*}$ that satisfies constraints (2).

For the case where $r^i(t)$ is generated to be the position of the laser beam, the filters $W_f(t)$, $W_s(t)$ can be designed as $$W_s^i(t) = \frac{T_s^i(t)}{T_f^i(t)}, W_f^i(t) = \frac{1}{T_f^i(t)}.$$

In one embodiment where $r^i(t)$ is generated to be the command to the fast actuator to obtain the desired position of the laser beam, the filter $W_f(t)$, $W_s(t)$ are designed as $$W_s^i(t) = \frac{T_s^i(t)}{T_f^i(t)}, W_f^i(t) = 1.$$

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an operation of a processing machine including redundant actuators for jointly positioning a worktool along each axis of motion, comprising:
   determining a reference trajectory defined in a spatial domain by points for positioning the worktool according to a processing pattern and defined in a time domain by a relative time for positioning the worktool on each point of the reference trajectory;
   selecting, from a set of points forming a segment of the reference trajectory to be processed for a period of time, a subset of points corresponding to a fraction of the period of time, where the subset of points is selected based on a state of the processing machine and locations of the points in the set such that the redundant actuators are capable to position the worktool at each point in the subset within the period of time and are capable to maintain the worktool at the last point of the subset after the period of time while satisfying constraints on motion of the redundant actuators;
   modifying the segment of the reference trajectory in the time domain by expanding units of time separating subsequent points in the subset to produce a modified segment of the reference trajectory having the subset of points processed for the period of time; and
   determining control inputs to the redundant actuators using the modified segment of the reference trajectory, wherein steps of the method are performed by at least one processor.

2. The method of claim 1, wherein the redundant actuators include a fast actuator and a slow actuator, wherein a range of motion of the slow actuator is greater than a range of motion of the fast actuator, and wherein acceleration and velocity constraints of the fast actuator are greater than acceleration and velocity constraints of the slow actuator, further comprising:

determining the spatial domain and the time domain of the reference trajectory for positioning the worktool according to the processing pattern only with motion of an actuator having the acceleration and velocity constraints of the fast actuator and unlimited range of the motion;

determining the subset of points for processing within the period of time with motion of the slow actuator capable to maintain the position of the worktool within the range of motion of the fast actuator from each point in the subset;

determining a motion profile for the slow actuator for processing the subset of points within the period of time with an accuracy defined by the range of motion of the fast actuator; and determining a motion profile of the fast actuator based on a difference between the modified reference trajectory and the motion profile for the slow actuator.

3. The method of claim 2, wherein the determining the subset of points comprises:

determining a point furthest from a first point in the set of points such that there is at least one motion profile for the slow actuator maintaining the worktool positioned by the slow actuator in a sequence of invariant regions defined by the range of the motion of the fast actuator centered at corresponding points in the subset from the first point to the furthest point in the set; and determining the subset of points to include all points in the set from the first point till the furthest point.

4. The method of claim 3, wherein the determining the furthest point uses linear or bisection search.

5. The method of claim 1, wherein the modifying the segment of the reference trajectory, comprises:

resampling a fraction of the segment defined by the subset of points with a new set of points preserving a number of points in the set of points.

6. The method of claim 1, wherein the state of the processing machine is a current state of the processing machine, further comprising:

measuring the current state of the processing machine to produce the state of the processing machine; and generating the control inputs to position the worktool on the modified segment of the reference trajectory.

7. The method of claim 1, wherein the state of the processing machine is a future state of the processing machine, further comprising:

determining the future state of the processing machine using a current state and a previously determined sequence of predicted control inputs for the processing machine;

determining a modified segment of the reference trajectory based on the future state of the processing machine, and segment of the reference trajectory appending the modified segment of the reference trajectory to a set of modified segments of the reference trajectory to form a prediction of the reference trajectory along a future prediction horizon;

determining a sequence of control inputs for positioning the worktool for the prediction horizon using a model of the processing machine; and selecting a subset of control inputs from the sequence of control inputs for positioning the worktool for a next control step.

8. The method of claim 1, wherein the processing machine is a laser processing machine, the worktool is a laser beam, and the pattern is a cutting pattern, and wherein the laser processing machine positions the laser beam according to the cutting pattern.

9. A control system for controlling an operation of a processing machine including redundant actuators for jointly positioning a worktool along each axis of motion, comprising processor for executing components of the control system, wherein the components comprises:

a trajectory generator for determining a reference trajectory defined in a spatial domain by points for positioning the worktool according to a processing pattern and defined in a time domain by a relative time for positioning the worktool on each point of the reference trajectory;

a reference governor for selecting, from a set of points forming a segment of the reference trajectory to be processed for a period of time, a subset of points corresponding to a fraction of the period of time and expanding units of time separating subsequent points in the subset to produce a modified segment of the reference trajectory having the subset of points processed for the period of time, wherein the subset of points is selected based on a state of the processing machine and locations of the points in the set such that the redundant actuators are capable to position the worktool at each point in the subset within the period of time and are capable to maintain the worktool at a point in the subset after the period of time while satisfying constraints on motion of the redundant actuators; and a controller for determining control inputs for the redundant actuators using the modified segment of the reference trajectory.

10. The control system of claim 9, wherein the redundant actuators include a fast actuator and a slow actuator, wherein a range of motion of the slow actuator is greater than a range of motion of the fast actuator, and wherein acceleration and velocity constraints of the fast actuator are greater than acceleration and velocity constraints of the slow actuator, wherein the trajectory generator determining the spatial and the time domains of the reference trajectory for positioning the worktool according to the processing pattern only with motion of an actuator having the acceleration and velocity constraints of the fast actuator and unlimited range of motion; wherein the reference governor determines the subset of points for processing within the period of time with motion of the slow actuator capable to maintain the position of the worktool around the point in the subset within a range of motion of the fast actuator; wherein the controller determines a motion profile for the slow actuator for processing the subset of points within the period of time with an accuracy defined by the range of motion of the fast actuator; and wherein the control system includes a filter for determining a motion profile for the fast actuator based on the difference between the modified reference trajectory and the motion profile for the slow actuator.

11. The control system of claim 10, wherein the reference governor determines a set of linear inequalities by constructing a subset of states of the processing machine and locations of the points such that when the locations of the points are continuously provided as command to the slow actuator from a current point of time to any future time, motion of the processing machine satisfies constraints on the motion at any future time.

12. The control system of claim 11, wherein the set of linear inequalities defines invariant regions of states of the slow actuator for modified reference trajectory, wherein each invariant region is included in an admissible region of the states of the slow actuator defined by constraint on the motion of the slow actuator and the range of the fast actuator, and the invariant region is such that if the state of the processing machine and a current position of the worktool is in the invariant region and a position command to the slow actuator is constantly equal to a value, the constraints of the machine are guaranteed not to be violated.

13. The control system of claim 10, wherein the controller determines the motion profile for the slow actuator by searching among points that satisfy constraints on the motion of the slow actuator to produce a set of motion profiles for the slow actuator, such that each motion profile for the slow actuator maintains the worktool position by the slow actuator in a sequence of invariant regions defined by the range of the motion of the fast actuator centered at corresponding points in the subset; and selecting the motion profile for the slow actuator reducing time for processing the pattern.

14. The control system of claim 10, wherein the controller is a model predictive controller for using the modified segment of the trajectory as part of a prediction horizon for determining control inputs.

15. The control system of claim 10, wherein the controller appends the modified segment of the reference trajectory to a set of modified segments of the reference trajectory to form the prediction horizon, determines a sequence of control inputs for positioning the worktool for the prediction horizon using a model of the processing machine; and selects a subset of control inputs from the sequence of control inputs for positioning the worktool for a next control step.

16. The control system of claim 10, wherein the filter determines the motion profile of the fast actuator based on a state of the slow actuator, a state of the fast actuator, and the modified reference trajectory, such that a combination of motions of the slow actuator and the fast actuator is equal to the motion of the actuator having the acceleration and velocity constraints of the fast actuator and the unlimited range of motion for processing the modified reference trajectory.

17. A processing machine, comprising:
redundant actuators for jointly positioning a worktool along each axis of motion, the redundant actuators include a fast actuator and a slow actuator, wherein a range of motion of the slow actuator is greater than a range of motion of the fast actuator, and wherein acceleration and velocity constraints of the fast actuator are greater than acceleration and velocity constraints of the slow actuator;
a trajectory generator for determining spatial and time domains of a reference trajectory for positioning the worktool according to a processing pattern only with motion of an actuator having acceleration and velocity constraints of the fast actuator and unlimited range of the motion;
a reference governor for modifying sequentially segments of the reference trajectory, such that the slow actuator is capable to process the modified segment of the reference trajectory within a period of time and is capable to maintain a position of the worktool around a point in the modified segment of the reference trajectory within the range of motion of the fast actuator for any time after the period of time;
a predictive controller for determining a motion profile of the slow actuator for processing the modified segment within the period of time with an accuracy defined by the range of motion of the fast actuator; and
a filter for determining a motion profile of the fast actuator based on a difference between the modified reference trajectory and the motion profile for the slow actuator.

18. The processing machine of claim 17, wherein the predictive controller uses the modified segment of the trajectory as part of a prediction horizon for determining control inputs defining the motion profile of the slow actuator.

* * * * *